(12) United States Patent
Phillips et al.

(10) Patent No.: US 8,713,617 B2
(45) Date of Patent: Apr. 29, 2014

(54) SYSTEMS AND METHODS FOR PROVIDING TELEVISION SIGNALS USING A NETWORK INTERFACE DEVICE

(75) Inventors: Bruce A. Phillips, Erie, CO (US);
Steven M. Casey, Littleton, CO (US);
Donald Brodigan, Broomfield, CO (US); Kurt A. Campbell, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 2679 days.

(21) Appl. No.: 10/444,941

(22) Filed: May 22, 2003

(65) Prior Publication Data
US 2004/0163125 A1  Aug. 19, 2004

Related U.S. Application Data

(63) Continuation-in-part of application No. 10/367,597, filed on Feb. 14, 2003, now Pat. No. 7,433,465, which is a continuation-in-part of application No. 10/356,364, filed on Jan. 31, 2003, now Pat. No. 7,180,988, which is a continuation-in-part of application No. 10/356,688, filed on Jan. 31, 2003, now Pat. No. 7,454,006, which is a continuation-in-part of application No. 10/356,338, filed on Jan. 31, 2003, now Pat. No. 8,537,814.

(51) Int. Cl.
*H04N 7/18* (2006.01)

(52) U.S. Cl.
USPC .................. 725/82; 725/80; 725/81; 725/153

(58) Field of Classification Search
USPC .................. 725/78, 82, 80, 151; 348/734
See application file for complete search history.

(56) References Cited

U.S. PATENT DOCUMENTS

| | | |
|---|---|---|
| 4,775,997 A | 10/1988 | West, Jr. et al. |
| 4,959,719 A | 9/1990 | Strubbe et al. |
| 4,989,230 A | 1/1991 | Gillig et al. |
| 5,202,765 A | 4/1993 | Lineberry |
| 5,327,156 A | 7/1994 | Masukane et al. |
| 5,361,098 A | 11/1994 | Lucas |
| 5,398,074 A | 3/1995 | Duffield et al. |
| 5,418,559 A | 5/1995 | Blahut |
| 5,463,422 A | 10/1995 | Simpson et al. |
| 5,485,221 A | 1/1996 | Banker et al. |
| 5,488,412 A | 1/1996 | Majeti et al. |
| 5,526,403 A | 6/1996 | Tam |

(Continued)

OTHER PUBLICATIONS

U.S. Appl. No. 10/356,364, Final Office Action dated Apr. 7, 2006, 9 pages.

(Continued)

*Primary Examiner* — Pankaj Kumar
*Assistant Examiner* — Timothy Newlin
(74) *Attorney, Agent, or Firm* — Swanson & Bratschun, L.L.C.

(57) ABSTRACT

An isolation device isolates a transport medium internal to a customer premises from a transport medium external to the customer premises such that operational changes to one of the internal and external transport media do not affect the other of the internal and external transport media. A first interface communicates with the external transport medium and a second interface communicates with the internal transport medium. An addressable set-top box external to the customer premises receives encoded telecommunication information from the external transport medium and generates television signals from the encoded telecommunication information for transmission over the internal transport medium.

29 Claims, 12 Drawing Sheets

(56) References Cited

U.S. PATENT DOCUMENTS

| | | | |
|---|---|---|---|
| 5,541,671 | A | 7/1996 | Pugel |
| 5,559,549 | A | 9/1996 | Hendricks et al. |
| 5,585,837 | A | 12/1996 | Nixon |
| 5,602,598 | A | 2/1997 | Shintani |
| 5,621,429 | A | 4/1997 | Yamaashi et al. |
| 5,621,482 | A | 4/1997 | Gardner et al. |
| 5,621,787 | A | 4/1997 | McKoy et al. |
| 5,633,683 | A | 5/1997 | Rosengren et al. |
| 5,635,980 | A | 6/1997 | Lin et al. |
| 5,638,112 | A | 6/1997 | Bestler et al. |
| 5,657,076 | A | 8/1997 | Tapp |
| 5,671,019 | A | 9/1997 | Isoe et al. |
| 5,691,777 | A | 11/1997 | Kasstly |
| 5,694,616 | A | 12/1997 | Johnson et al. |
| 5,748,255 | A | 5/1998 | Johnson et al. |
| 5,760,842 | A | 6/1998 | Song |
| 5,771,465 | A | 6/1998 | Bojeryd |
| 5,774,172 | A | 6/1998 | Kapell et al. |
| 5,774,885 | A | 6/1998 | Delfer, III |
| 5,781,620 | A | 7/1998 | Montgomery et al. |
| 5,790,201 | A | 8/1998 | Antos |
| 5,815,208 | A | 9/1998 | Samuela et al. |
| 5,815,216 | A | 9/1998 | Suh |
| 5,831,591 | A | 11/1998 | Suh |
| 5,844,552 | A | 12/1998 | Gaughan et al. |
| 5,894,320 | A | 4/1999 | Vancelette |
| 5,900,867 | A | 5/1999 | Schindler et al. |
| 5,900,916 | A | 5/1999 | Pauley |
| 5,912,711 | A | 6/1999 | Lin et al. |
| 5,923,379 | A | 7/1999 | Patterson |
| 5,969,769 | A | 10/1999 | Hamadate |
| 5,970,386 | A * | 10/1999 | Williams ................ 725/69 |
| 5,971,921 | A | 10/1999 | Timbel |
| 5,977,963 | A | 11/1999 | Gaughan et al. |
| 6,012,100 | A | 1/2000 | Frailong et al. |
| 6,061,719 | A | 5/2000 | Bendinelli et al. |
| 6,073,171 | A | 6/2000 | Gaughan et al. |
| 6,097,383 | A | 8/2000 | Gaughan et al. |
| 6,134,320 | A | 10/2000 | Swan et al. |
| 6,201,538 | B1 | 3/2001 | Wugofski |
| 6,202,212 | B1 | 3/2001 | Sturgeon et al. |
| 6,256,785 | B1 | 7/2001 | Klappert et al. |
| 6,259,440 | B1 | 7/2001 | Vaughan et al. |
| 6,272,680 | B1 | 8/2001 | Gaughan et al. |
| 6,288,749 | B1 | 9/2001 | Freadman |
| 6,313,851 | B1 | 11/2001 | Matthews et al. |
| 6,317,164 | B1 | 11/2001 | Hrusecky et al. |
| 6,324,184 | B1 | 11/2001 | Hou et al. |
| 6,326,982 | B1 | 12/2001 | Wu et al. |
| 6,330,285 | B1 | 12/2001 | Crosby et al. |
| 6,331,852 | B1 | 12/2001 | Gould et al. |
| 6,333,976 | B2 | 12/2001 | Lesley |
| 6,337,717 | B1 | 1/2002 | Nason et al. |
| 6,357,045 | B1 | 3/2002 | Devaney |
| 6,359,973 | B1 | 3/2002 | Rahamim et al. |
| 6,392,664 | B1 | 5/2002 | White et al. |
| 6,396,480 | B1 * | 5/2002 | Schindler et al. ........... 345/169 |
| 6,405,371 | B1 | 6/2002 | Oosterhout et al. |
| 6,441,861 | B2 | 8/2002 | Vaughan et al. |
| 6,452,611 | B1 | 9/2002 | Gerba et al. |
| 6,452,923 | B1 * | 9/2002 | Gerszberg et al. .......... 370/352 |
| 6,456,335 | B1 | 9/2002 | Miura et al. |
| 6,456,340 | B1 | 9/2002 | Margulis |
| 6,463,273 | B1 | 10/2002 | Day |
| 6,481,012 | B1 | 11/2002 | Gordon et al. |
| 6,481,013 | B1 | 11/2002 | Dinwiddie et al. |
| 6,492,997 | B1 | 12/2002 | Gerba et al. |
| 6,493,036 | B1 | 12/2002 | Fernandez |
| 6,493,038 | B1 | 12/2002 | Singh et al. |
| 6,493,878 | B1 | 12/2002 | Kassatly |
| 6,502,242 | B1 | 12/2002 | Howe et al. |
| 6,505,123 | B1 | 1/2003 | Root et al. |
| 6,510,557 | B1 | 1/2003 | Thrift |
| 6,512,551 | B1 | 1/2003 | Lund |
| 6,512,552 | B1 | 1/2003 | Subramanian |
| 6,519,283 | B1 | 2/2003 | Cheney et al. |
| 6,526,579 | B2 | 2/2003 | Sato |
| 6,526,581 | B1 * | 2/2003 | Edson ............................ 725/74 |
| 6,536,041 | B1 | 3/2003 | Knudson et al. |
| 6,538,701 | B1 | 3/2003 | Yuen |
| 6,542,500 | B1 | 4/2003 | Gerszberg et al. |
| 6,556,251 | B1 | 4/2003 | Sorensen |
| 6,556,252 | B1 | 4/2003 | Kim |
| 6,563,515 | B1 | 5/2003 | Reynolds et al. |
| 6,567,106 | B1 | 5/2003 | Wugofski |
| 6,567,984 | B1 | 5/2003 | Allport |
| 6,590,615 | B2 | 7/2003 | Murakami et al. |
| 6,593,937 | B2 | 7/2003 | Ludtke et al. |
| 6,621,870 | B1 | 9/2003 | Gordon et al. |
| 6,628,302 | B2 | 9/2003 | White et al. |
| 6,658,464 | B2 | 12/2003 | Reisman |
| 6,678,007 | B2 | 1/2004 | Nason et al. |
| 6,678,009 | B2 | 1/2004 | Kahn |
| 6,687,374 | B2 | 2/2004 | Leuca et al. |
| 6,700,625 | B1 | 3/2004 | Fujii |
| 6,727,886 | B1 | 4/2004 | Mielekamp et al. |
| 6,727,918 | B1 | 4/2004 | Nason |
| 6,727,960 | B2 | 4/2004 | Seo |
| 6,732,373 | B2 | 5/2004 | Harrison et al. |
| 6,738,820 | B2 | 5/2004 | Hilt |
| 6,741,617 | B2 | 5/2004 | Rosengren et al. |
| 6,745,021 | B1 | 6/2004 | Stevens |
| 6,757,707 | B1 | 6/2004 | Houghton et al. |
| 6,760,782 | B1 | 7/2004 | Swales |
| 6,784,945 | B2 | 8/2004 | Norsworthy et al. |
| 6,785,906 | B1 | 8/2004 | Gaughan et al. |
| 6,795,506 | B1 | 9/2004 | Zhng et al. |
| 6,809,776 | B1 | 10/2004 | Simpson |
| 6,816,878 | B1 | 11/2004 | Zimmers et al. |
| 6,833,874 | B2 | 12/2004 | Ozaki et al. |
| 6,833,877 | B2 | 12/2004 | Wang |
| 6,842,628 | B1 | 1/2005 | Arnold et al. |
| 6,857,131 | B1 | 2/2005 | Yagawa et al. |
| 6,882,714 | B2 | 4/2005 | Mansfield |
| 6,896,276 | B1 | 5/2005 | Sparrow |
| 6,898,413 | B2 | 5/2005 | Yip et al. |
| 6,903,753 | B1 | 6/2005 | Gray et al. |
| 6,909,903 | B2 | 6/2005 | Wang |
| 6,924,846 | B2 | 8/2005 | Ohba et al. |
| 6,934,753 | B2 | 8/2005 | Kim |
| 6,948,076 | B2 | 9/2005 | Saito |
| 6,957,275 | B1 | 10/2005 | Sekiguchi |
| 6,970,127 | B2 | 11/2005 | Rakib |
| 6,975,324 | B1 | 12/2005 | Valmiki et al. |
| 6,978,474 | B1 | 12/2005 | Sheppard et al. |
| 7,010,608 | B2 | 3/2006 | Garg et al. |
| 7,023,492 | B2 | 4/2006 | Sullivan |
| 7,035,270 | B2 | 4/2006 | Moore et al. |
| 7,180,988 | B2 | 2/2007 | Phillips et al. |
| 7,263,362 | B1 | 8/2007 | Young et al. |
| 2001/0021997 | A1 | 9/2001 | Lee |
| 2001/0024239 | A1 | 9/2001 | Feder et al. |
| 2001/0048481 | A1 | 12/2001 | Hatano et al. |
| 2002/0026642 | A1 | 2/2002 | Augenbraun et al. |
| 2002/0037004 | A1 | 3/2002 | Bossemeyer et al. |
| 2002/0044225 | A1 | 4/2002 | Rakib |
| 2002/0054062 | A1 | 5/2002 | Gerba et al. |
| 2002/0057372 | A1 | 5/2002 | Cavallerano et al. |
| 2002/0089605 | A1 | 7/2002 | Min |
| 2002/0110115 | A1 | 8/2002 | Gorman et al. |
| 2002/0147987 | A1 | 10/2002 | Reynolds et al. |
| 2002/0171552 | A1 | 11/2002 | Tate |
| 2003/0013441 | A1 | 1/2003 | Bhogal et al. |
| 2003/0016304 | A1 | 1/2003 | Norsworthy et al. |
| 2003/0026416 | A1 | 2/2003 | Fusco |
| 2003/0028879 | A1 | 2/2003 | Gordon et al. |
| 2003/0030652 | A1 | 2/2003 | Billmaier et al. |
| 2003/0035075 | A1 | 2/2003 | Butler et al. |
| 2003/0056215 | A1 | 3/2003 | Kanungo |
| 2003/0067926 | A1 | 4/2003 | Gerszberg et al. |
| 2003/0069002 | A1 | 4/2003 | Hunter et al. |
| 2003/0072330 | A1 | 4/2003 | Yang et al. |
| 2003/0083533 | A1 | 5/2003 | Gerba et al. |
| 2003/0179858 | A1 | 9/2003 | Bella et al. |

(56) References Cited

U.S. PATENT DOCUMENTS

| | | |
|---|---|---|
| 2003/0184679 A1 | 10/2003 | Meehan |
| 2003/0192057 A1 | 10/2003 | Gaughan et al. |
| 2003/0226143 A1 | 12/2003 | Michael et al. |
| 2004/0027487 A1 | 2/2004 | Rzadzki et al. |
| 2004/0049785 A1 | 3/2004 | Grzeczkowski et al. |
| 2004/0052578 A1 | 3/2004 | Baldino et al. |
| 2004/0073941 A1 | 4/2004 | Ludvig et al. |
| 2004/0092276 A1 | 5/2004 | Dooley |
| 2004/0136373 A1 | 7/2004 | Bareis |
| 2004/0150158 A1 | 8/2004 | Biegelsen et al. |
| 2004/0150748 A1 | 8/2004 | Phillips et al. |
| 2004/0150749 A1 | 8/2004 | Phillips et al. |
| 2004/0150750 A1 | 8/2004 | Phillips et al. |
| 2004/0150751 A1 | 8/2004 | Phillips et al. |
| 2004/0151161 A1 | 8/2004 | Casey et al. |
| 2004/0151168 A1 | 8/2004 | Phillips et al. |
| 2004/0151289 A1 | 8/2004 | Phillips et al. |
| 2004/0160460 A1 | 8/2004 | Casey et al. |
| 2004/0163125 A1 | 8/2004 | Phillips et al. |
| 2004/0172657 A1 | 9/2004 | Phillips et al. |
| 2004/0176085 A1 | 9/2004 | Phillips et al. |
| 2004/0184523 A1 | 9/2004 | Dawson et al. |
| 2005/0034155 A1 | 2/2005 | Gordon et al. |
| 2005/0091695 A1 | 4/2005 | Paz et al. |
| 2005/0149981 A1 | 7/2005 | Augenbraun et al. |
| 2006/0020992 A1 | 1/2006 | Pugel et al. |
| 2006/0031582 A1 | 2/2006 | Pugel et al. |
| 2006/0156368 A1 | 7/2006 | Campbell |
| 2013/0273962 A1 | 10/2013 | Phillips et al. |

OTHER PUBLICATIONS

U.S. Appl. No. 10/356,364, Notice of Allowance dated Oct. 17, 2006, 4pgs.
U.S. Appl. No. 10/254,179, Office Action dated Sep. 11, 2006, 15 pages.
U.S. Appl. No. 10/356,364, Supplemental Notice of Allowance dated Dec. 5, 2006, 2 pgs.
U.S. Appl. No. 10/356,688, Office Action dated Jul. 29, 2005, 15 pages.
U.S. Appl. No. 10/356,688, Office Action dated Jun. 19, 2006, 13 pages.
U.S. Appl. No. 10/367,596, Appeal Brief dated Jul. 7, 2006, 17 pgs.
U.S. Appl. No. 10/367,596, Final Office Action dated Feb. 10, 2006, 7 pgs.
U.S. Appl. No. 10/367,596, Final Office Action dated May 25, 2007, 7 pgs.
U.S. Appl. No. 10/367,596, Final Office Action dated Sep. 28, 2007, 6 pgs.
U.S. Appl. No. 10/367,596, Final Office Action dated Sep. 8, 2006, 6 pgs.
U.S. Appl. No. 10/367,596, Office Action dated Dec. 18, 2006, 6 pgs.
U.S. Appl. No. 10/367,596, Office Action dated Mar. 31, 2008, 6 pgs.
U.S. Appl. No. 10/367,596, Office Action dated Sep. 30, 2005, 9 pages.
U.S. Appl. No. 10/377,283, Advisory Action dated Jun. 3, 2008, 3 pgs.
U.S. Appl. No. 10/377,283, Office Action dated Jul. 25, 1998, 10 pgs.
U.S. Appl. No. 10/377,281, Final Office Action dated May 24, 2006, 10 pages.
U.S. Appl. No. 10/377,281, Office Action dated Dec. 21, 2005, 13 pages.
U.S. Appl. No. 10/377,282, Final Office Action dated May 24, 2006, 15 pages.
U.S. Appl. No. 10/377,282, Office Action dated Dec. 21, 2005, 14 pages.
U.S. Appl. No. 10/377,283, Advisory Action dated Jul. 2, 2007, 3 pgs.
U.S. Appl. No. 10/377,283, Final Office Action dated Jun. 26, 2007, 8 pgs.
U.S. Appl. No. 10/377,283, Final Office Action dated Mar. 26, 2008, 10 pgs.
U.S. Appl. No. 10/377,283, Final Office Action dated May 24, 2006, 11 pages.
U.S. Appl. No. 10/377,283, Final Office Action dated May 24, 2006, 9 pgs.
U.S. Appl. No. 10/377,283, Office Action dated Dec. 15, 2005, 14 pages.
U.S. Appl. No. 10/377,283, Office Action dated Dec. 15, 2005, 7 pgs.
U.S. Appl. No. 10/377,283, Office Action dated Oct. 11, 2006, 8 pgs.
U.S. Appl. No. 10/377,283, Office Action dated Sep. 28, 2007, 8 pgs.
U.S. Appl. No. 10/377,290, Final Office Action dated May 24, 2006, 10 pages.
U.S. Appl. No. 10/377,290, Office Action dated Dec. 15, 2005, 12 pages.
U.S. Appl. No. 10/377,584, Office Action dated May 11, 2006, 7 pages.
U.S. Appl. No. 10/377,584, Office Action dated Nov. 17, 2005, 8 pages.
U.S. Appl. No. 10/377,584, Notice of Allowance dated Oct. 2, 2006, 4 pages.
2004_March—Quality Validation_Implementation Guide—A Customer_Public Information Publication_26 Pages.
U.S. Appl. No. 10/448,249, Final Office Action dated Feb. 6, 2008, 18 pgs.
U.S. Appl. No. 10/448,249, Office Action dated Aug. 15, 2007, 16 pgs.
U.S. Appl. No. 10/448,249, Office Action dated Sep. 4, 2008, 19 pgs.
U.S. Appl. No. 10/624,454, Advisory Action dated Jun. 19, 2008, 3 pgs.
U.S. Appl. No. 10/624,454, Final Office Action dated Apr. 7, 2008, 10 pgs.
U.S. Appl. No. 10/624,454, Office Action dated Jul. 24, 2008, 11 pgs.
U.S. Appl. No. 10/676,418, Final Office Action dated Aug. 9, 2006, 14 pages.
U.S. Appl. No. 10/676,418, Notice of Allowance dated Oct. 19, 2006, 4 pgs.
U.S. Appl. No. 10/676,418, Office Action dated Feb. 23, 2006, 13 pgs.
U.S. Appl. No. 10/676,429, Advisory Action dated Dec. 8, 2008, 3 pgs.
U.S. Appl. No. 10/676,429, Final Office Action dated Sep. 26, 2008, 21 pages.
U.S. Appl. No. 10/676,429, Office Action dated Mar. 17, 2008, 19 pgs.
U.S. Appl. No. 10/367,596; Decision on Appeal dated Apr. 23, 2012; 10 pages.
U.S. Appl. No. 10/367,596; Final Rejection dated Dec. 5, 2012; 11 pages.
U.S. Appl. No. 10/367,596; Non-Final Rejection dated Aug. 24, 2012; 12 pages.
U.S. Appl. No. 13/915,930; Non-Final Rejection dated Oct. 25, 2013; 65 pages.

* cited by examiner

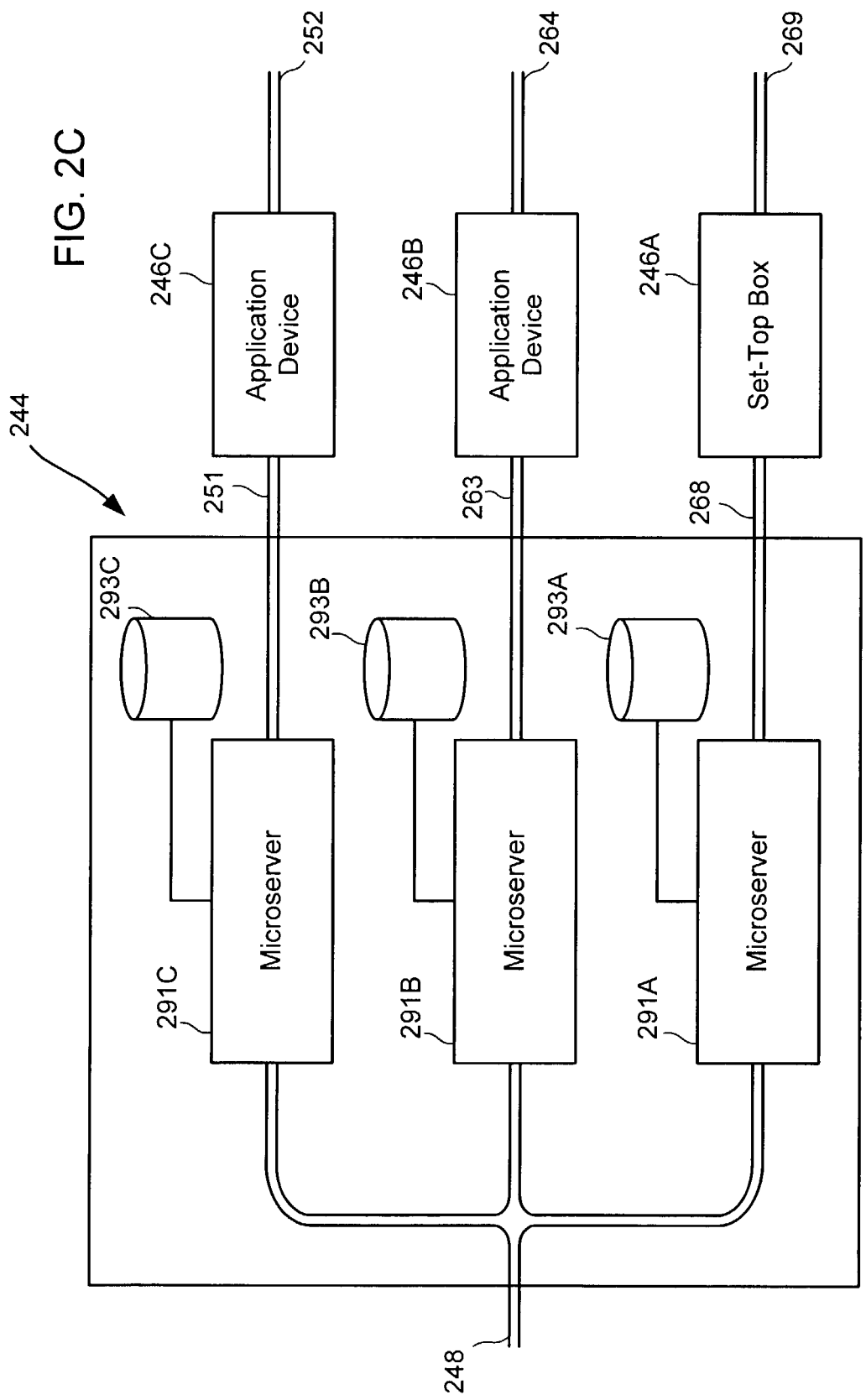

SYSTEMS AND METHODS FOR PROVIDING TELEVISION SIGNALS USING A NETWORK INTERFACE DEVICE

CROSS-REFERENCES TO RELATED APPLICATIONS

This application is a continuation-in-part of U.S. patent application Ser. No. 10/367,597, entitled "SYSTEMS AND METHODS FOR PROVIDING APPLICATION SERVICES VIA A NETWORK INTERFACE DEVICE," filed Feb. 14, 2003 by Steven M. Casey et al.; is a continuation-in-part application of U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; is a continuation-in-part application of U.S. patent application Ser. No. 10/356, 688, entitled "SYSTEMS, METHODS AND APPARATUS FOR PROVIDING A PLURALITY OF TELECOMMUNICATION SERVICES," filed Jan. 31, 2003 by Bruce A. Phillips et al.; and is a continuation-in-part application of U.S. patent application Ser. No. 10/356,338, entitled "CONFIGURABLE NETWORK INTERFACE DEVICE AND SYSTEMS AND METHODS FOR ITS USE," filed Jan. 31, 2003 by Bruce A. Phillips et al., the entire disclosure of each of which is herein incorporated by reference for all purposes. These applications are sometimes referred to collectively herein as "the parent applications."

BACKGROUND OF THE INVENTION

This application relates generally to telecommunication systems. More specifically, this application relates to methods and systems for providing television signals using a network interface device.

Currently, many television services are providing using set-top boxes, which are devices configured to decode incoming signals for transmission to the television, sometimes in accordance with terms of a user subscription. The use of such set-top boxes is especially dominant in applications providing digital television signals, but is also used in many applications providing analog television signals as well. For example, a user may have a subscription agreement with a cable-television provider to receive a premium television channel that is not accessible to customers who have not paid for the subscription agreement. The signal for that premium channel is transmitted uniformly to customers, but in an encoded form that may be decoded only by those set-top boxes that have been instructed to do so. In a similar manner, set-top boxes are often used to provide programming on a pay-per-view basis, with a signal for a particular program being decoded only when a user has agreed to pay the associated fee for viewing that program. In other applications, set-top boxes may be used to provide a user interface between a user's television and the Internet by incorporating a browser module within the set-top box. As their name implies, set-top boxes are typically provided as integrated devices adapted to rest on top of television sets, with connections between the set-top box and television allowing transmission of information between them.

While set-top boxes are thus useful because of the diverse range of services, including individualized services, that may be provided to users, the need for each user to have a set-top box is a significant deterrent to their use. Many users do not have set-top boxes because they are inconvenient to acquire from the programming provider. Usually, an individual needs to stay at home when the set-top box is delivered so that it can be installed by a technician. Sometimes, an individual may alternatively pick up a set-top box at an outlet of the programming provider, but must do so when the outlet is open and must perform the installation himself. This inconvenience is then repeated when the user moves or otherwise decides to discontinue the service. Furthermore, in some instances, individuals simply dislike the clutter of still another device peripheral to the operation of their television, in addition to a DVD player, VCR, and the like.

The inconvenience of having to use a set-top box is exacerbated further in locations where there are relatively high turnover rates of residents. For example, the length of an individual's stay in a hotel, apartment, or other large-turnover residence may be sufficiently short that the individual decides not to subscribe to services because of the inconveniences associated with the set-top box.

There is accordingly a general need in the art for improved methods and systems of providing television signals.

BRIEF SUMMARY OF THE INVENTION

Embodiments of the invention thus provide a network interface device that improves providing television signals. An isolation device is adapted to isolate a transport medium internal to a customer premises from a transport medium external to the customer premises such that operational changes to one of the internal and external transport media do not affect the other of the internal and external transport media. A first interface is coupled with the isolation device and adapted to communicate with the external transport medium, which is in communication with a distribution point. A second interface is coupled with the isolation device and adapted to communicate with the internal transport medium. An addressable set-top box is disposed external to the customer premises and coupled with the first and second interfaces. The set-top box is adapted to receive encoded telecommunication information from the external transport medium and to generate television signals from the encoded telecommunication information for transmission over the internal transport medium. In some embodiments, the network interface device may be disposed on an exterior wall of the customer premises.

In certain embodiments, an addressable application device is also coupled with the first and second interfaces and adapted to implement a supplementary application over the internal transport medium with telecommunication information received from the external transport medium. In other embodiments, a third interface may be coupled with the isolation device and adapted to communicate with a second transport medium external to the customer premises. In such instances, an addressable application device may be coupled with the third and second interfaces and adapted to implement a supplementary application over the internal transport medium with telecommunication information received from the second external transport medium. In either of these sets of embodiments, the addressable set-top box and addressable application device may be disposed within a common housing.

Different types of telecommunication information may be accommodated in different embodiments. For example, in one embodiment, the encoded telecommunication information comprises encoded digital telecommunication information. In such an embodiment, the addressable set-top box comprises a digital decoder adapted to decode the encoded digital telecommunication information. In another embodiment, the encoded telecommunication information comprises encoded IP telecommunication information. In this embodiment, the addressable set-top box comprises an IP decoder adapted to decode the encoded IP telecommunication information. In some embodiments, the addressable set-top box may further comprise a buffer data store.

In some instances, a plurality of addressable set-top boxes may conveniently be used to accommodate multi-dwelling units such as apartment buildings or hotels. In one such embodiment, the internal transport medium thus comprises a plurality of transport media internal to a plurality of respective customer premises. The second interface comprises a plurality of second interfaces coupled with the isolation device, each of which may be adapted to communicate with a respective one of the internal transport media. The addressable set-top box comprises a plurality of addressable set-top boxes, each of which is coupled with the first interface and with a respective one of the second interfaces. Each addressable set-top box is adapted to receive encoded telecommunication information from the external transport medium and to generate television signals from the encoded telecommunication information for transmission over the respective one of the internal transport media. The plurality of customer premises may be located within a common physical structure, in which case the network interface may be disposed on an exterior wall of the common physical structure or within the common physical structure but external to each of the respective customer premises in different embodiments.

In other embodiments, a method provides television signals. A transport medium internal to a customer premises is isolated from a transport medium external to the customer premises such that operational changes to one of the internal and external transport media do not affect the other of the internal and external transport media. Encoded telecommunication information is received from the external transport medium. The encoded telecommunication information is decoded with an addressable set-top box disposed external to the customer premises. The television signals are generated from the decoded telecommunication information and transmitted to the internal transport medium for display on a television within the customer premises.

In some embodiments, an instruction is received to change a state of the addressable set-top box and the state is changed in accordance with the received instruction. In other embodiments, a supplementary application is implemented over the internal transport medium with telecommunication information received from the external transport medium. In further embodiments, telecommunication information is received from a second transport medium external to the customer premises and a supplementary application is implemented over the internal transport medium with the telecommunication information received from the second external transport medium. The encoded telecommunication information may include such information as encoded digital telecommunication information or encoded IP telecommunication information. In one embodiment the television signals may be stored with a buffer data store comprised by the set-top box. In still other embodiments, telecommunication information may be decoded with a plurality of set-top boxes and respective television signals transmitted to respective ones of a plurality of transport media internal to respective ones of a plurality of customer premises.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a capital-letter sublabel is associated with a reference numeral to denote one of multiple similar components. When reference is made to a reference numeral without specification to an existing sublabel, it is intended to refer to all such multiple similar components.

FIGS. 2A-2D provide schematic illustrations of network interface systems according to embodiments of the invention.

DETAILED DESCRIPTION OF THE INVENTION

1. Introduction

Figure 1A:
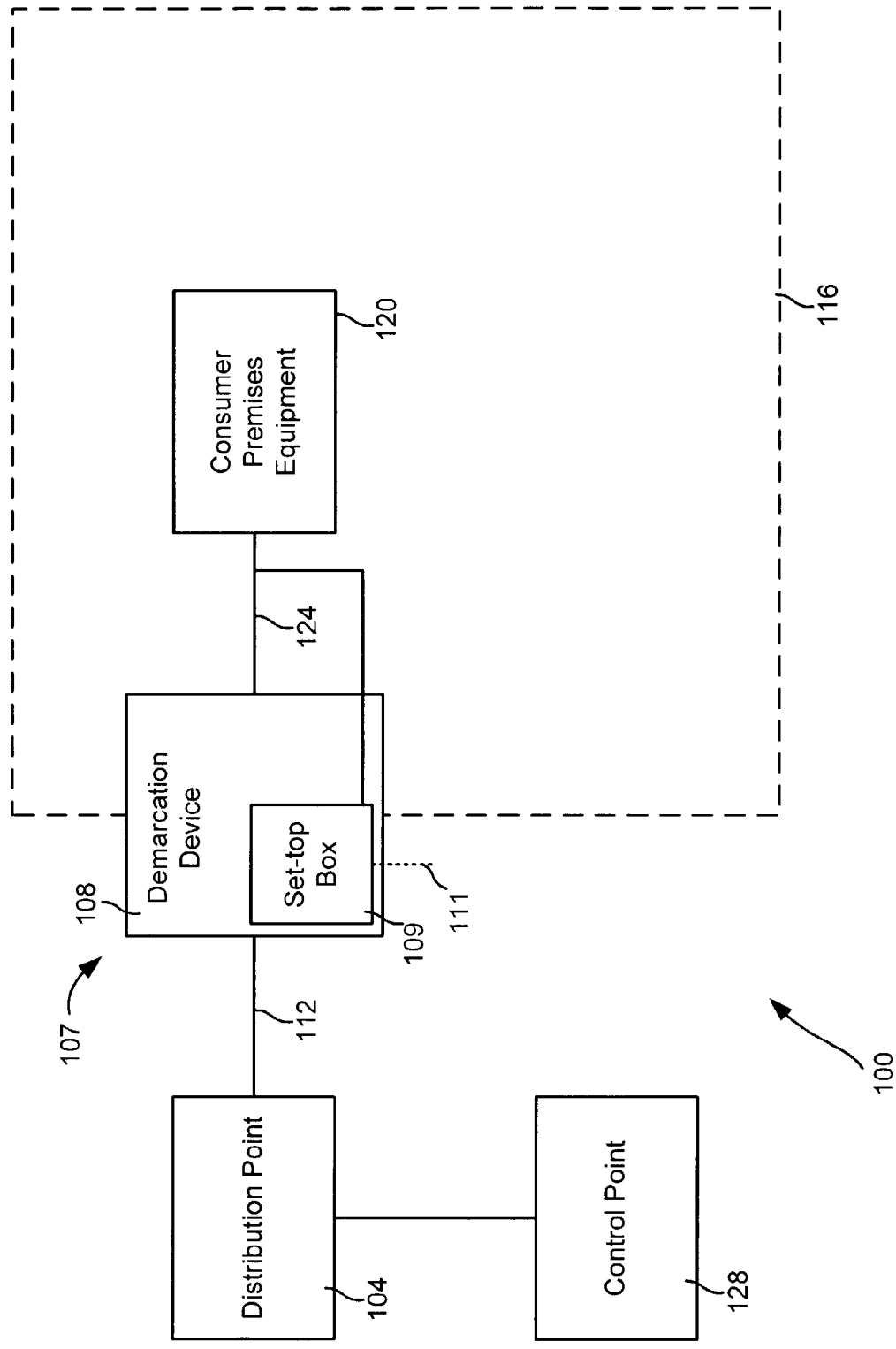
FIGS. 1A-1G provide schematic illustrations of embodiments of the invention that use demarcation and application devices to provide a network interface system.

Embodiments of the invention are directed to methods and systems for providing television signals using a network interface device that includes an external set-top box ("ESTB"). As used herein, the terms "external set-top box" and "ESTB" are intentionally analogized with a traditional set-top box because they may perform similar functionality to a traditional set-top box, although in some embodiments the functionality extends beyond what may be performed using a traditional set-top box. The term is not intended to connote that the "external set-top box" or "ESTB" is to be disposed on top of a television set. Instead, according to embodiments of the invention, the "external set-top box" or "ESTB" is disposed external to a customer premises as defined below, and may be specifically associated with a network interface device ("NID"), detailed descriptions of which are also provided below for specific embodiments. In some instances, the "external set-top box" or "ESTB" may be embedded within the NID. Furthermore, the NID may be configured in some embodiments to provide additional application services supplementary to those provided with the "external set-top box" or "ESTB". The scope of such supplementary application services may be broad, and includes such examples as may be broadly classified as including communications application services, informational application services, diagnostic application services, monitoring application services, and data storage application services, among others. Several specific examples of supplementary application services that may be provided are discussed in greater detail below.

In embodiments of the invention, the NID is capable of interfacing between a customer premises and a telecommunication service provider's network. In some instances the interfacing capability of the NID may additionally include a "demarcation capability," which is described in further detail below with specific examples of how the demarcation capabilities arise in different embodiments. In some instances, the NID may additionally include other capabilities, including, for example, the capability to separate received telecommunication information into discrete sets; the capability to process certain of the separated sets independently from other sets; and/or the capability to transmit different of the separated sets to different locations, perhaps through the use of different interfaces.

In describing embodiments of the invention, references to "customer premises" are intended to refer to physical structures under the control of a customer through ownership, leasehold, or any other property right. The term is not intended to encompass open real property external to the physical structures, even if such open real property is also under the control of the customer. Such a definition reflects differences in accessibility to the physical structures and surrounding open real property. Access to the physical structures generally requires the presence of the customer or a representative of the customer, while access to the surrounding open real property may be obtained by permission from customer, through an easement, or by other means that does not require the physical presence of the customer. Thus, for example, in the case of a residential customer, the customer premises may correspond to the customer's home, but does not include the yard surrounding the home. Access to the yard may be obtained even when the customer is not home, such as when the customer is at work, is shopping, or is otherwise unavailable to be physically present.

In the case of multiple-dwelling units ("MDU"), each dwelling unit may correspond to a distinct customer premises. In such cases, the MDU defines a plurality of customer premises, which may sometimes be located within a single physical structure, such as in the case of an apartment building or hotel MDU. There may be locations within the single physical structure that do not correspond to customer premises because they are not under the control of the customer, but are rather under the control of another party such as a landlord or hotel management. Similar to the yard example above, accessibility of such locations may be provided even when the customer is not present, such as through permission of the other party.

As used herein, the term "telecommunication information" is broadly defined to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC, PAL, and SECAM formatting, as well as, for example any of the MPEG digital encoding and/or compression algorithms), and data. Such data can be formatted according any of a variety of protocols familiar in the art, including in particular the Internet Protocol.

In this application, the term "telecommunication service provider" refers to any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is intended to describe a discrete subset of the telecommunication information transmitted across a particular transport medium and/or received by a device having demarcation capabilities. Generally, the telecommunication information that is classified part of a particular information set shares a common characteristic. Merely by way of example, an information set can comprise telecommunication information of a particular type, such as voice, IP data, encoded video, and such; information associated with a particular application, such as information assigned to a specific IP port, as is known in the art; information addressed to or received from a particular device or network segment; information received within a particular reception window; and the like.

In certain embodiments, demarcation capabilities can support the one-way flow of telecommunication information, such as exemplified by the case of a simple set top box, which can receive data representing a video signal, decode that data, and transmit a video signal to an attached television. In other embodiments, demarcation capabilities can support bidirectional flow of telecommunication information. In still other embodiments, the demarcation capability can support both unidirectional and bidirectional information flows simultaneously, depending on the type of telecommunication information transmitted or the source of the information.

The demarcation capabilities may also function to isolate the telecommunication service provider's network from the network at the customer premises. As described in detail below, the service provider's network is one example of an "external transport medium" and the customer's network is one example of an "internal transport medium." The external transport medium and internal transport medium are each examples of a "transport medium," which is used herein to describe any cable, wire, or other medium capable of carrying telecommunication information, including, but not limited to, twisted pair copper wiring (shielded or unshielded, including, for example, unshielded cables complying with industry-standard categories 3, 5, 5e and 6), optical fiber, and coaxial cable. Other examples of transport media include universal serial bus ("USB") cable, cable complying with the Institute of Electrical and Electronics Engineers' ("IEEE") 1394 standard, as well as any medium capable of complying with the many local-area networking standards known in the art. The preceding are examples of transport media that comprise physical media, but the invention is not limited to the use of physical media. In other embodiments, a transport medium may comprise any of a wide variety of wireless transmissions, including infra-red transmissions, radio frequency ("RF") transmissions, and transmissions complying with standards developed by any of the IEEE's working groups governing wireless communication (e.g., the 802.11, 802.15, 802.16 and 802.20 working groups), as well as point-to-point microwave, satellite, cellular/PCS, and/or ultra wideband transmissions, among others.

In certain embodiments, demarcation capabilities can define an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media, and/or other operational parameters of a network. This isolation feature can provide many benefits; for instance, the demarcation capability can be realized by a disclosed interface between a customer premises and a provider's network, allowing the provider to implement changes in its network without disrupting the service provided to the customer.

Likewise, the isolation of the internal transport medium from the external transport medium can allow for any variety of customer premises equipment ("CPE") to be used at the customer premises without fear that the equipment might be incompatible with a particular telecommunication service provider's standards. "Customer premises equipment" and "CPE" are intended to refer to any device that sends, receives, or otherwise utilizes telecommunication information. Moreover, the demarcation capabilities might serve to couple a plurality of external and/or internal transport media, allowing interoperation among them all, and to provide the same isolation features among all of these media.

In this way, certain aspects of the demarcation capabilities can allow for sales of a wide variety of CPE on a consumer electronics model, instead of the proprietary model necessitated by many of today's telecommunication networks, where, for example, differing implementations of xDSL among providers virtually force consumers to purchase modems from the providers to ensure compatibility between the modem and the provider's xDSL implementation. By isolating the topologies of the external and internal transport media, embodiments of the present invention can create a disclosed interface between the provider's network and the customer's network, allowing much greater flexibility in both the provider's networking options and the customer's choice of telecommunication appliances. Those skilled in the art will recognize that these and many other benefits result from embodiments of the invention.

In accordance with other embodiments, the isolation abilities also allow insulation between different transport media coupled to the internal and external transport media in order. This may permit, for example, preventing unwanted telecommunication information of one network from entering the other network. For instance, a demarcation capability of a network interface system in accordance with particular embodiments can serve to prevent propagation of certain telecommunication information from an internal network (including particular signals or frequencies) into one or more external transport media, preventing interference in the internal transport medium from interfering with the telecommunication service provider's network. In similar fashion, demarcation capabilities can prevent the contamination of the internal transport medium with unwanted information from the external medium, interference between two or more external transport media coupled, and unwanted interference or crosstalk between multiple internal media.

In some embodiments, the isolation of the internal transport medium from the external transport medium resulting from the demarcation capabilities also allows enhanced security to be provided for the customer and/or to control customer access to certain features or services. For instance, those skilled in the art will recognize that demarcation capabilities can prevent unauthorized access to the customer's data network, such as by a telecommunication service provider and/or a third party, or can screen or filter telecommunication information entering or leaving the customer's premises. This enables features such as parental controls to be placed on incoming and outgoing information, as well as filtering of outgoing sensitive information, such as credit card information and the like.

Further, according to certain embodiments, the demarcation capabilities may be used to define a consolidation point for all telecommunication information entering or leaving the customer premises. Definition of such a consolidation point permits a variety of enhanced features to be provided to the entire premises, including features such as caller identification, premises-wide telephone, video and data distribution, content on demand, including video, audio, and/or data on demand, and the like. These and other features resulting from demarcation capabilities also allow for a variety of new and useful telecommunication applications to be provided to customers. Specific details of some exemplary applications are discussed below; given the disclosure herein, those skilled in the art can appreciate the wide variety of such applications that are possible using various embodiments of the invention.

In a number of embodiments, the demarcation capability is applied specifically to a customer premises, thereby separating a transport medium internal to the customer premises from a transport medium external to the customer premises. Moreover, the demarcation is exploited to provide the ESTB, perhaps with supplementary addressable application devices in a configuration that permits ESTB and perhaps other services to be provided to the entire premises. For example, the ESTB and other addressable application devices may be disposed external to the customer premises, as may be one or more processors. The ESTB and other addressable application devices may be adapted to interface with the transport medium internal to the customer premises, and the processors may be adapted to selectively process telecommunication information originating from the transport medium external to the customer premises. ESTB and other applications may be implemented through transmission of the processed telecommunication information from the processors to the ESTB and other addressable application devices. Not only does such a configuration permit applications to service the entire premises, disposing the ESTB and other addressable application devices external to the customer premises makes them easily accessible by technicians as need for service or to change their operational states.

2. Organizational Configurations

There are numerous organizational configurations that may be used- in accordance with embodiments of the invention. Several examples are shown schematically in FIGS. 1A-1G, although such examples are not intended to be exhaustive. A relatively simple arrangement is shown in FIG. 1A, which illustrates a configuration 100 for providing television signals using an ESTB. The configuration 100 includes a distribution point 104 in communication with a device 108 having demarcation capabilities via an external transport medium 112. In this example, the external transport medium 112 comprises a transport medium external to a customer premises 116. The device 108 is shown in FIG. 1A as including an ESTB 109 adapted to interface with an internal transport medium 124. In this example, the internal transport medium 124 comprises a transport medium internal to the customer premises 116. While the ESTB 109 is shown as part of the demarcation device 108, this is not a requirement. In other instances, the ESTB 109 may be distinct from, but coupled with, the demarcation device 108, such as by using a modular design with plug-and-play technology. Other examples discussed below illustrate different ways in which the demarcation and ESTB devices 108 and 109 may be configured as integrated or separate devices. For convenience, however, the combination of the demarcation 108 device and ESTB 109 is sometimes referred to in a particular embodiment as an "set-top-box network interface device" ("SNID") 107 irrespective of whether they are integrated or separate.

In some embodiments discussed below, an SNID may correspond to one of a plurality of "application network interface devices" ("ANIDs") that may be provided. An ANID corresponds generally to a combination of a network interface device and an application device, of which the ESTB 109 may be considered to be an example. As such, an SNID may be considered to correspond specifically to an ANID that includes an ESTB as one of its application devices.

In one sense, the distribution point 104 may be considered to be a source of telecommunication information transmitted to the customer premises and a recipient of telecommunication information transmitted from the customer premises; as described below, however, the distribution point 104 need not be either the ultimate source nor the ultimate recipient of telecommunication information. In certain embodiments, the distribution point 104 may correspond to a telecommunication service provider's local office. In other embodiments, the distribution point may correspond to another network element in the service provider's network, such as a remote termination cabinet and/or a digital subscriber line access multiplier ("DSLAM"). More generally, the distribution point 104 may correspond to any facility operated by a telecommunication service provider that is capable of transmitting telecommunication information to, and/or receiving telecommunication information from, a customer premises 116.

In general, distribution points can be classified, inter alia, as discrete distribution points or complex distribution points. With respect to a particular information set, a discrete distribution point often transmits only the necessary or desired information to the SNID 107. In contrast, a complex distribution point can transmit the entire information set to the SNID 107. The contrast may be illustrated with regard to video distribution: A discrete distribution point may perform channel switching (at the request of the demarcation device 108), encoding and sending only the desired channel information to the demarcation device 108. In contrast, a complex distribution point might rely upon the demarcation device 108 to perform all channel switching. Those skilled in the art will appreciate that each scheme presents relative advantages and disadvantages.

Distribution point 104 can be capable of transmitting and/or receiving any type of telecommunication information to/from the SNID 107, and such telecommunication information can be organized into a plurality of telecommunication information sets, as necessary. For ease of description, FIG. 1A does not show any additional sources or recipients of telecommunication information in communication with distribution point 104, but, those skilled in the art will recognize that, in many embodiments, distribution point 104 can be coupled to multiple customer premises 116 (perhaps via an SNID 107 at each customer premises) and often is neither the ultimate source nor the ultimate recipient of telecommunication information. Instead, distribution point 104 usually serves as an intermediary between one or more customer premises 116 and one or more larger telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises 116 and any source and/or recipient of telecommunication information that has a connection to the Internet. The interconnection of telecommunication networks is well known in the art, although it is specifically noted that distribution point 104 can be configured to transmit telecommunication information to (and receive telecommunication information from) virtually any source or recipient of telecommunication information, through either direct or indirect (e.g., through the Internet) communication. Merely by way of example, a distribution point 104 can transmit video signals received from a television programming provider to customer premises equipment, as described in the applications referenced above. In other embodiments, distribution point 104 can be in communication with one or more other customer locations, allowing for private virtual circuits, vlan tags and wavelengths, or rf connections between customer premises 116 and those locations.

In configuration 100, the SNID 107 can serve as the interface between external transport medium 112 and customer premises 116. As shown in FIG. 1A, usually both the demarcation device 108 and the 109 comprised by the SNID 107 are interfaced with the internal transport medium 124, with the demarcation device interfaced with the external transport medium 112, although other interfacing configurations are also within the scope of the invention. For example, the ESTB 109 may additionally be interfaced with the external transport medium 112. The ESTB 109 may also include a service interface 111 for addressing the ESTB 109. The service interface 111 may comprise a physical interface, such as a universal serial bus ("USB"), FireWire (IEEE 1394), registered jack 11 ("RJ-11"), registered jack 13 ("RJ-13"), registered-jack 45 ("RJ-45"), serial, coax, or other physical interface known to those of skill in the art. In other embodiments, the service interface 111 may comprise a logical interface, such as may be provided through a logical connection with an IP address.

As conceptually illustrated in FIG. 1A, demarcation device 108 and/or ESTB 109 may be attached to an external wall of the customer premises 116. Such attachment may be performed of an integrated SNID 107 or may be performed with the components separately of a separated SNID 107. Such a configuration provides many advantages. For instance, if the telecommunication service provider desires to upgrade or otherwise change its network, including, perhaps, external transport medium 112, a technician can perform any necessary changes at demarcation device 108 and/or ESTB 109 as appropriate without entering the customer premises. Coupled with the ability of some demarcation devices 108 to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises 116. In addition, disposing the set-top box in a secure fashion external to the customer premises precludes removal or tampering with the set-top box, and simplifies implementing changes of service such as may occur when tenants of the customer premises change. Of course, demarcation device 108 and/or ESTB 109 may be located at a variety of alternative locations, and, as previously noted, an SNID 107 may also be divided, with different portions situated at different locations, according to the requirements of the implementation.

The ESTB 109 is configured so that it may communicate with CPE 120, which may include a television device and may be located interior to the customer premises through internal transport medium 124. Such communication is used to implement the ESTB 109 functionality with the CPE 120 in accordance with telecommunication information received from the distribution point 104. In addition, the demarcation device 108 may communicate directly with CPE 120 to implement other functions, including functions that may be defined by other applications comprised by the demarcation device 108. While the internal transport medium 124 may comprise any of the media discussed above, in one embodiment it comprises existing wiring in customer premises 116 and, in some embodiments, is capable of carrying voice, data, and video information. For instance, as described in Edward H. Frank and Jack Holloway, "Connecting the Home with a Phone Line Network Chip Set," IEEE Micro (IEEE, March-April 2000), which is incorporated herein by reference, the Home Phoneline Networking Alliance ("HPNA") standards allow for simultaneous transmission of both voice information and Ethernet frames across twisted-pair copper telephone wiring. In addition to the transmission of telecommunication information through the SNID 107, either directly from the demarcation device 108 or through the ESTB 109, telecommunication information may be transmitted via the reverse path to the distribution point 104. Such telecommunication information received at the distribution point 104 may be transmitted to an information recipient, such as a service provider. For example, such a transmission may be used to request a pay-per-view movie or the like. Alternatively, telecommunication information received at the distribution point 104 may be transmitted across the Internet, such as may be used in the case of sending an email message where the ESTB 109 supports Internet functionality.

In certain embodiments, the SNID 107 can receive state information from a control point 128, which is shown in the illustrated embodiment as associated with distribution point 104. In certain instances, control point 128 can be software and/or hardware operated by a telecommunication service provider for controlling certain features of the operation of the SNID 107. For instance, control point 128 can instruct the SNID 107 to provide (or cease to provide) particular applications and/or telecommunication services with the ESTB 109 to the customer premises 116. Control point 128 can also provide other directions to the SNID 107 through the demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand.

Often, it may be beneficial to allow the customer to provide state information to the SNID 107. Thus, in certain embodiments, control point 128 may have a web interface, such that the customer or any authorized person, such as an employee of the telecommunication service provider or telecommunication information provider, may log onto the web interface and configure options for the SNID 107, perhaps resulting in state commands being transmitted from the distribution point 104 to the SNID 107. In other embodiments, control point 128 can be a web interface to the SNID 107 itself, allowing the customer or other authorized person to configure the SNID 107 directly. In still other embodiments, control point 128 can communicate with the SNID 107 through an application programming interface ("API"). Hence, in some embodiments, control point 128 can interface with the SNID 107 through an API.

In many such embodiments, the API corresponds to the service interface 111 of the application device. In embodiments where the service interface 111 comprises a logical interface, the API can include a set of software, hardware, or firmware routines or libraries that may be invoked programmatically to configure or relay information to the ESTB 109. In that sense, then, control point 128 can be understood to be a program running on a computer, perhaps located at distribution point 104 or customer premises 116, among other locations, that provides state information to the ESTB 109 via a software API.

In other embodiments where the service interface 111 comprises a physical interface such as those described above, the APT may be accessed locally, such as by a service technician. For example, the service technician could visit property outside the customer premises 116 or a utility room in an MDU that is external to individual customer premises 116, attach a laptop computer or other device to the physical service interface 111, and upload information to the ESTB 109, including state information and perhaps other telecommunication information. In still other embodiments, the ESTB 109 can accept state information through other means, including, for example, through a web interface by receiving a specially formatted electronic message. This is especially the case in embodiments where the ESTB 109 is capable of acting as a web server, as discussed below.

The addressability of the ESTB 109 may be used in various embodiments to change the state of the ESTB 109. Such state information can include any set of data or other information that may be interpreted by the ESTB 109 as defining operational instructions. This includes, for example, commands to process certain information sets in certain ways, e.g., to provide protocol conversion, to allow transmission of the information set, to deny transmission of the information set, to direct transmission on a particular interface, and the like, as well as commands to provide or cease providing a particular service, such as to provide access to a pay-per-view movie. Thus, in certain aspects, a telecommunication service provider can control the services provided to a customer in several ways. First, the provider can only transmit a telecommunication information set to an SNID 107 if the user of that device is authorized to receive that information set. Alternatively, the service provider could send a plurality of information sets to a customer's SNID 107, and rely on the state of the component ESTB 109 to determine access to those information sets that are authorized.

Those skilled in the art will appreciate that certain control methods are more well-suited to certain services than to others. For instance, with respect to cable television services, the same set of information may be broadcast to many households, and the SNID 107 is well-suited to control access to those services, allowing for greater efficiency in the providing of such services. In contrast, video-on-demand services may instead be controlled at a distribution point 104 or elsewhere such that a particular SNID 107 only receives video-on-demand information if the customer already has requested and been authorized to receive that service. In such cases, the SNID 107 may not need to provide access control functions with respect to that service.

According to some embodiments, the SNID 107 can implement either of these access control schemes, or both in combination, as well as others. Moreover, the SNID 107 can, in some cases, be configured to support a plurality of schemes transparently. For instance, the customer could request a service from the SNID 107, perhaps using one of the methods discussed above, and the SNID 107 could relay that request to the appropriate telecommunication service provider and/or telecommunication information provider, as well as reconfigure itself to allow access to that service, if necessary. Of course, the SNID 107 can also be configured to take any necessary validating or authenticating action, such as notifying the distribution point 104 and/or control point 128 that the service has been requested, and, optionally, receiving a return confirmation that the service has been authorized.

In accordance with other embodiments, state information sent to the SNID 107 can include one or more commands to interface with a particular CPE in a certain way. State information can further include instructions to modify one or more security settings of the SNID 107. Merely by way of example, in certain embodiments, the SNID 107 can include a computer virus scanner, and state information can include updated virus definitions and/or heuristics. Likewise, the SNID 107 often will be configured with access controls, such as to prevent unauthorized access through the SNID 107 by third parties. State information can include instructions on how to deal with particular third-party attempts to access the SNTD 107 or internal transport medium 124. Those skilled in the art will recognize as well that some security settings may specify the level of access the customer has to the functions of the SNID 107, such as to prevent unauthorized use of certain telecommunication services, and that these settings also may be modified by received state information.

There are a variety of ways in which the various access-control and security functionalities of the SNID 107 discussed above may be implemented. In different embodiments, these functionalities may be performed by the demarcation device 108, by the ESTB 109, by a combination of the demarcation and ESTB devices 108 and 109, and/or by still other supplementary application devices that may additionally be comprised by the SNID 107. Moreover, the state information that manages such functionalities may sometimes be sent periodically to the SNID 107 to ensure that it is current. Those skilled in the art will also recognize that state information can be considered a subset of the broader category of telecommunication information.

Figure 1B:
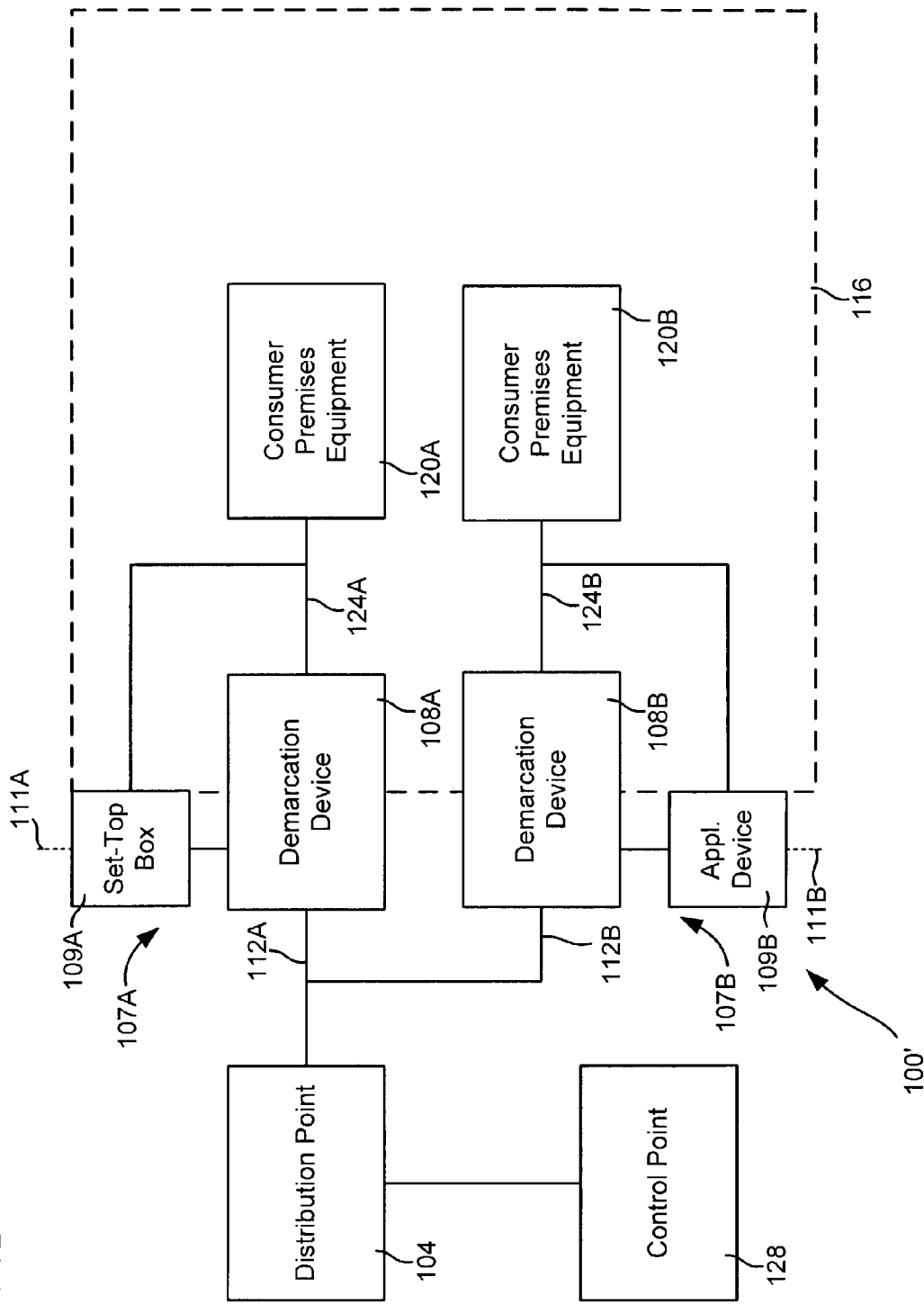

Turning now to FIG. 1B, configuration 100' is illustrative of certain embodiments that can provide multiple ANIDs at customer premises 116, at least of which may be an SNID 107A. In the illustrated embodiment, the SNID 107A comprises demarcation device 108A and ESTB 109A, and another ANID 107B comprises demarcation device 108B and application device 109B. In some embodiments, ANID 107B may specifically not include an ESTB, so that all set-top-box functions are performed by SNID 107A, although more generally ANID 107B could also include an ESTB. In this illustration, the both the ESTB device 109A and the other application device 109B are shown as separated from their respective demarcation devices 108, although one or more of the multiple SNID or ANID may alternatively comprise structures in which they are integrated. In instances where the components are separated, the separate components may both be affixed to an exterior wall of the customer premises 116. This has the same advantages discussed previously in connection with integrated SNIDs, namely ease of upgrading or otherwise changing the network by a telecommunication service provider. In other instances, the separate components may be provided in different locations, such as by providing the demarcation device 108A or 108B at a facility operated by the telecommunication service provider while keeping the ESTB 109A or other application device 109B on the exterior wall of the customer premises 116.

Similar to the configuration of FIG. 1A, ESTB 109A may be in communication with CPE 120A through internal transport medium 124A and other application device 109B may be in communication with CPE 120B through internal transport medium 124B. Implementation of the applications provided by ESTB 109A and application device 109B can thus be achieved respectively with telecommunication information received and transmitted by demarcation devices 108A and 108B. In addition, demarcation device 108A can be in direct communication with CPE 120A through internal transport medium 124A, and demarcation device 108B can likewise be in direct communication with CPE 120B through internal transport medium 124B. Each of the SNID 107A and ANID 107B may be provided in communication with a common distribution point 104 through their respective demarcation devices 108. In particular, demarcation device 108B can communicate with distribution point 104 through external transport medium 112B which, as illustrated by FIG. 1B, can simply be spliced into external transport medium 112A, such as by using an active or passive splitting device, which could be optical, as in a fiber environment, or electrical. If desired, demarcation devices 108 and/or distribution point 104 can include control logic to prevent unauthorized access by demarcation device 108A to telecommunication information sent to or received from demarcation device 108B, and vice versa. In other embodiments, external transport medium 112B could run directly from demarcation device 108B to distribution point 104. In still other embodiments, external transport medium 112B could be omitted, with demarcation device 108B coupled to demarcation device 108A, which could then provide connectivity between demarcation device 108B and distribution point 104 through external transport medium 112A.

Configuration 100' can be used in a variety of implementations. For instance, if customer premises 116 is a multiple-dwelling unit ("MDU"), ANID 107B could comprise an SNID by including an ESTB as application device 109B, such that separate SNIDs are provided for each separate resident or family. Alternatively, a single demarcation device, perhaps with more interfaces, can service multiple dwelling or business units. In such implementations, especially when external transport medium 112B does not directly couple demarcation device 108B to distribution point 104, demarcation devices 108A, 108B can include security functionality, for example to prevent telecommunication signals intended for CPE 120A from reaching CPE 120B and vice versa. In some embodiments, demarcation devices 108 can provide a variety of such security, encryption, and authentication functions.

Figure 2A:
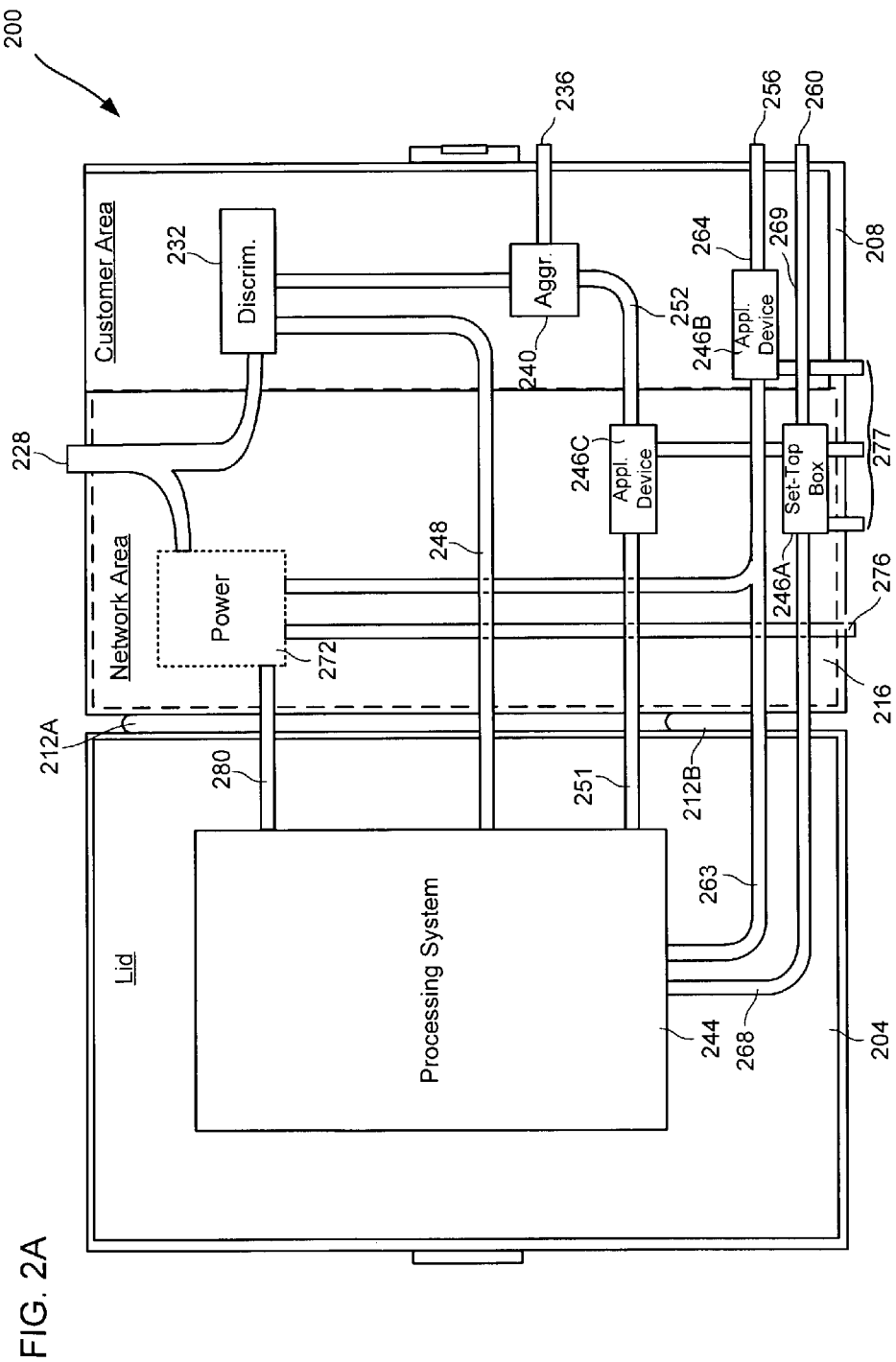

The description above provides a specific example of a more general class of embodiments in which multiple SNIDs are daisy-chained together, using any of the telecommunication media discussed herein. This allows a telecommunication service provider to provide service to additional customers without requiring any additional external transport media. Similarly, SNIDs at multiple premises can be coupled together, such that if the external transport medium coupled to one of the SNIDs fails, that device can maintain connectivity to the distribution point through its connection to another SNID. An SNID in accordance with specific embodiments thus may have an interface for securely connecting to one or more additional SNIDs, and thus forming a mesh network of SNIDs and/or distribution points. This allows a particular SNID to serve as a conduit between another interface device and a distribution point without allowing any unauthorized reception of telecommunication information intended for the connected interface device. This secure interface can be included, for instance, in a portion of the SNID that is inaccessible to customers, as illustrated in FIG. 2A and described below.

Figure 1C:
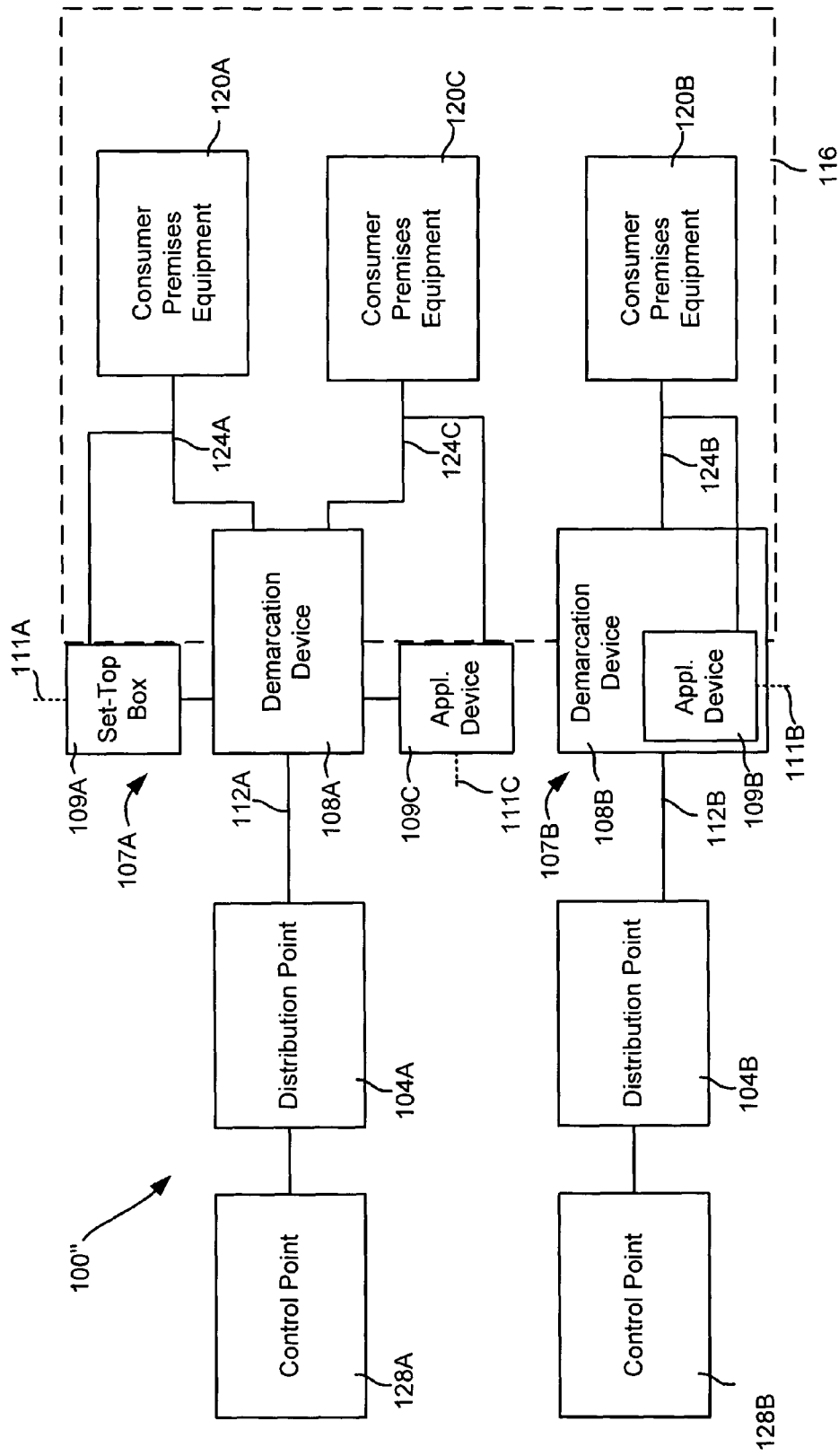

In other embodiments, a single customer premises 116 might have connections to a plurality of telecommunication service providers. For example, turning now to FIG. 1C, configuration 100" includes a distribution point 104A coupled to an SNID 107A via external transport medium 112A and also includes a second distribution point 104B coupled to an ANID 107B via external transport medium 112B. SNID 107A provides an example of an SNID that includes a supplementary application device 109C in addition to the ESTB 109A. Each of these devices 109A and 109C may have a respective service interface 111A and 111C, and may be connected with different internal transport media 124A or 124C to reflect the different application capabilities. Merely by way of example, distribution point 104A could, for example, be associated with a cable television provider, while distribution point 104B could be associated with a telephone company. In addition, configuration 100" illustrates that multiple CPE 120A and 120C may be coupled with a single SNID 107A. This may be done with multiple internal transport media 124A and 124C as illustrated by FIG. 1C, or may alternatively be done through a common internal transport medium as discussed below. In some embodiments, the other application devices 109B and 109C do not comprise an ESTB, but in other embodiments they may. In embodiments where application device 109B comprises an ESTB, ANID 107B thus corresponds to a second SNID provided to customer premises 116. In embodiments where application device 109C comprises an ESTB, SNID 107A thus corresponds to a multi-ESTB SNID that may provide separate set-top-box capabilities to different CPE 120A and 120C. Each of these configurations provides a mechanism for providing separate set-top-box capabilities to different CPE within the customer premises, as may be desirable, for example, where different individuals wish to watch different pay-per-view programming on different televisions.

Figure 1D:
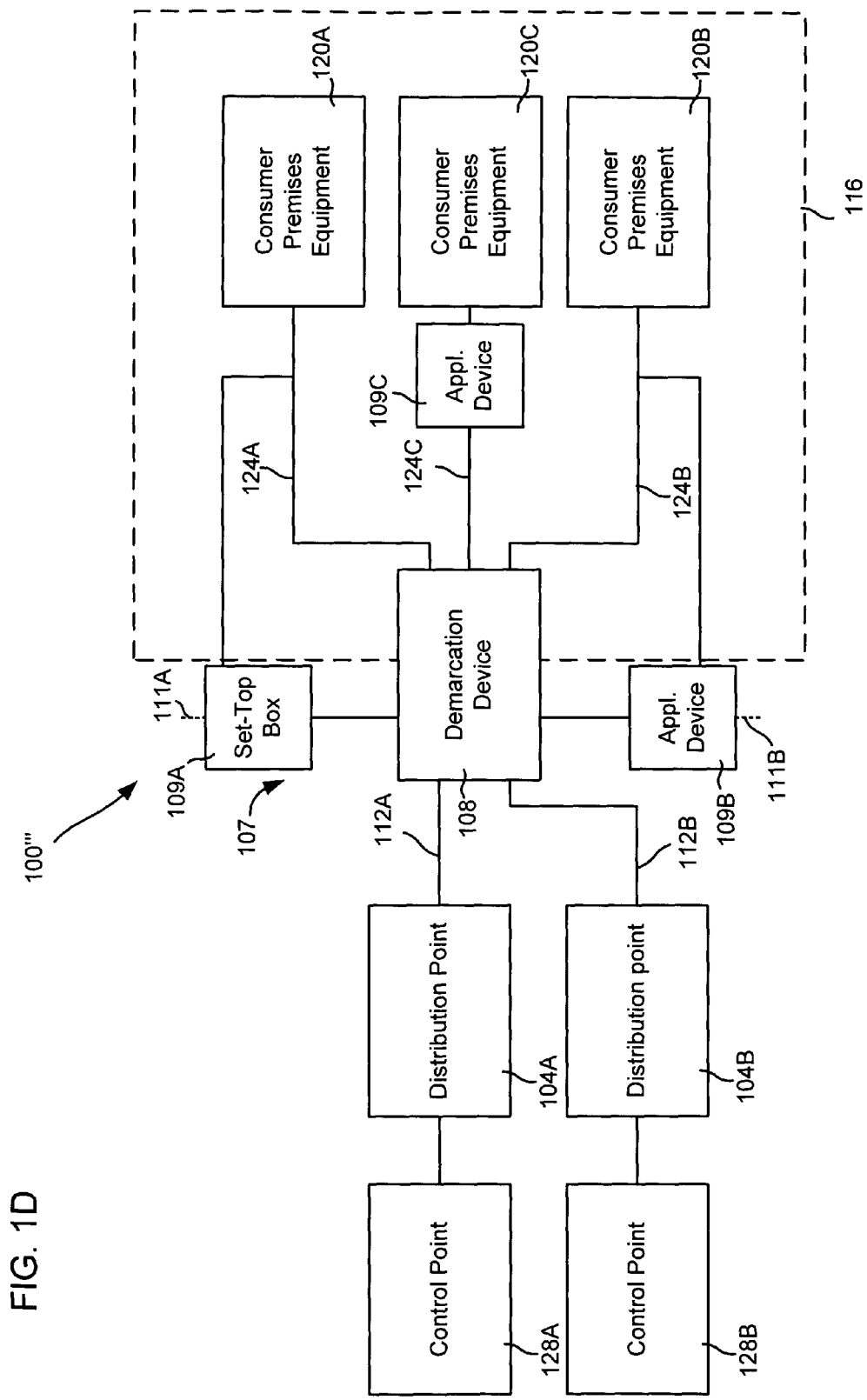

In another alternative embodiment, such as configuration 100''' illustrated in FIG. 1D, an SNID 107 can provide connectivity to a plurality of distribution points 104A and 104B, as well to a plurality of CPE 120A, 120B, and 120C. In the illustrated configuration 100''', the SNID 107 is provided in a separated form with an ESTB 109A and two other application devices 109B and 109C for providing supplementary application services. The ESTB 109A and one of the other application devices 109B are provided external to the customer premises 116 and have service interfaces 111A and 111B. The second other application device 109C is provided interior to the customer premises, illustrating that it is not a requirement that all of the supplementary application devices comprised by the SNID 107 be disposed external to the customer premises 116. In embodiments where one or more of the other application devices, say application device 109B, comprises an ESTB, the SNID 107 corresponds to a multi-ESTB SNID that may provide separate set-top-box capabilities to different CPE 120A and 120B. Furthermore, in some embodiments application device 109C could comprise an ESTB, whereby the overall arrangement comprises set-top-box capabilities not only in the external SNID 107, but also comprises one or more set-top boxes interior to the premises. The connectivity of a single SNID 107 to a plurality of distribution points 104A and 104B and to a plurality of CPE 120A, 120B, and 120C may be effected through attachments for multiple internal transport media 124A, 124B, and 124C and for multiple external transport media 112A and 112B. Moreover, as illustrated by FIG. 1D, each distribution point 104A and 104B may be associated with a different control point 128A and 128B, respectively. In alternative embodiments, a single control point 128 could provide configuration information to the SNID 107 with respect to both distribution points 104A and 104B.

Figure 1E:
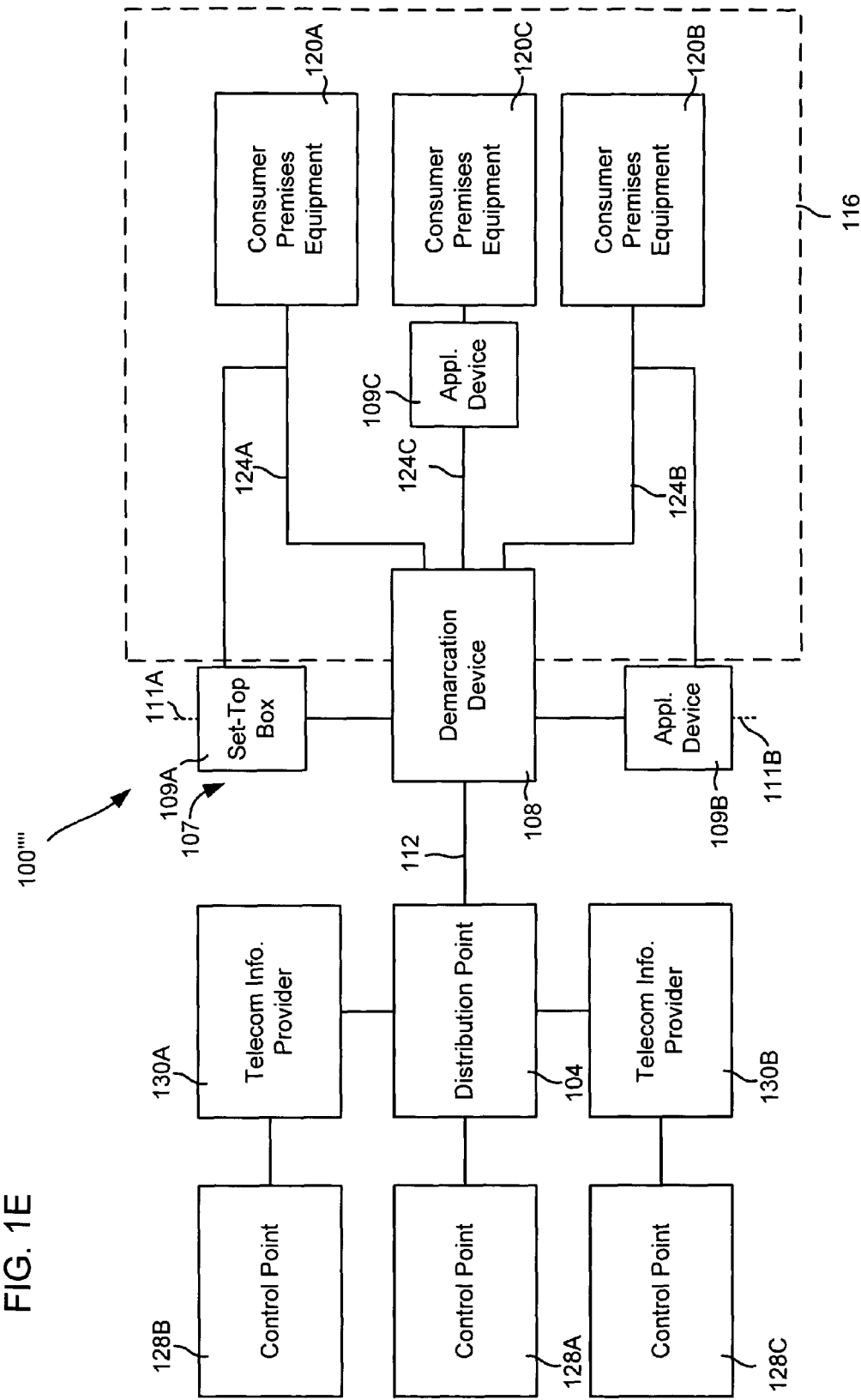

Turning now to FIG. 1E, another exemplary configuration 100'''' is presented in accordance with certain embodiments of the invention. In exemplary system 100'''', the SNID 107 is shown having a configuration similar to that of FIG. 1D, with a structure in which the demarcation-, ESTB-, and other application-device components are separated, including one of the other application devices 109C in the interior of the customer premises 116. Instead of communication of the SNID 107 with a plurality of control points 128 being effected through a plurality of distribution points 104, FIG. 1E shows an embodiment in which such communication is achieved with a common distribution point 104. This distribution point 104, which may be operated by a telecommunication service provider, can be in communication with one or more telecommunication information providers 130A and 130B. Each telecommunication information provider 130A and 130B can be the source or recipient of one or more telecommunication information sets, each of which may be associated with a particular telecommunication service. Each of the telecommunication information sets may thus be transmitted to, or received from, the distribution point 104. Distribution point 104 can also transmit these information sets to, or received them from, the SNID 107 through demarcation device 108, via external transport medium 112. Such an configuration 100'''' thus exploits a capability of the SNID 107 to process a plurality of such information sets in a variety of ways, as discussed below.

In certain embodiments, each telecommunication information provider 130A or 130B may have an individual control point 128B or 128C. In some such embodiments, control points 128B and 128C can be in communication with the SNID 107 via distribution point 104 or, alternatively, could have a separate means of communication with the SNID 107, such as via a modem and telephone line. Thus, in some embodiments, the SNID 107 can receive state information from each control point 128B, and 128C through the demarcation device 108. As discussed above, state information can direct the behavior of the demarcation device 108, ESTB I09A, and/or other application devices 109B and 109C comprised by the SNID 107, in particular with respect to how to handle telecommunication information to implement various applications on the CPE 120A, 120B, and/or 120C. Such state information may be received by the SNID 107 over the external transport medium 112 or through the service interfaces 111A and 111B of the ESTB 109A and other application device 109B. In some embodiments, the SNID 107 can be configured to accept state information related only to the telecommunication information and/or services provided by the telecommunication information provider sending the state information. In this way, the SNID 107 can be protected against inadvertent or malicious misconfiguration, which could interrupt a telecommunication service provided by another telecommunication information provider. Likewise, the SNID 107 could be configured to automatically request updated state information from control point 128A associated with distribution point 104 in the case of misconfiguration, and control point 128A could maintain a master set of configuration information to be able to accommodate such a request.

In other embodiments, telecommunication information providers 130A and 130B may not have an associated control point. In such embodiments, telecommunication information providers 130A and 130B can send state information to control point 128A, perhaps via distribution point 104A, and control point 128A can relay that state information to the demarcation device 108 (again, perhaps through distribution point 104). In this way the telecommunication service provider can control which state information is transmitted to the SNID 107.

In certain embodiments, the demarcation device 108 can submit a request for state information to one or more control points 128A, 128B, and/or 128C, perhaps via distribution point 104. Such a request might be made if, for instance, the customer would like to watch a pay-per-view movie. The appropriate control point, e.g., 128B, could then provide the proper state information to the SNID 107 as described above, allowing transmission of the movie to customer premises 116.

Figure 1F:
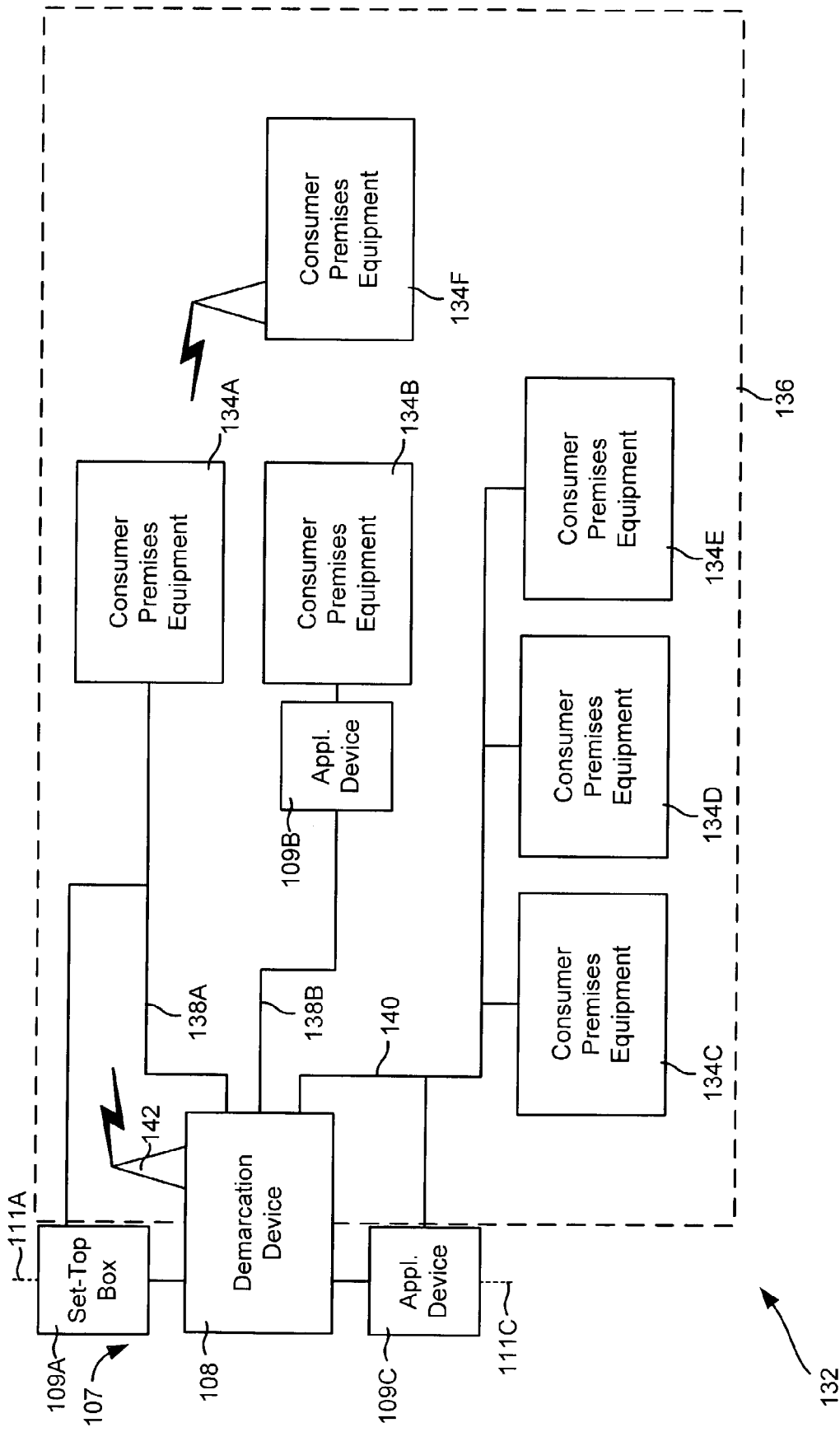

As exemplified by configuration 132 in FIG. 1F, embodiments of the invention enable a single SNID 107 to serve multiple CPE 134A-F, each of which can comprise a different appliance, at a single customer premises 136. The flexibility provided by the SNID 107 may be exemplified in an embodiment where the SNID 107 includes other application devices 109B and 109C in addition to the ESTB 109A for providing a variety of supplementary application services. For instance, CPE 134A can be a television, CPE 134B can be a telephone, CPE 134C can be a video game system, CPE 134D can be a computer with an Ethernet interface, CPE 134E can be a computer with an HPNA interface, and CPE 134F can be a laptop computer equipped with a wireless network card. The user functionality of each of these CPE examples may be enhanced with the ESTB 109A and other application devices 109B and 109C comprised by the SNID 107.

Also as illustrated by configuration 132, the single SNID 107 can support multiple network topologies. For instance, the SNID 107 can serve as a hub for a point-to-point network topology, with multiple point-to-point connections to CPE 134A and 134B via internal transport media 138A and 138B, respectively. In addition, the SNID 107 can support a bus topology, as illustrated by internal transport medium 140, which can connect the SNID 107 to CPE 134C, 134D, and 134E. The SNID 107 can also be equipped with a wireless transmitter 142 for communication with wireless-capable CPE 134F. In this way, the SNID 107 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. The SNID 107 can support these and other network topologies, serving as the hub in a 10Base-T network if necessary.

Figure 1G:
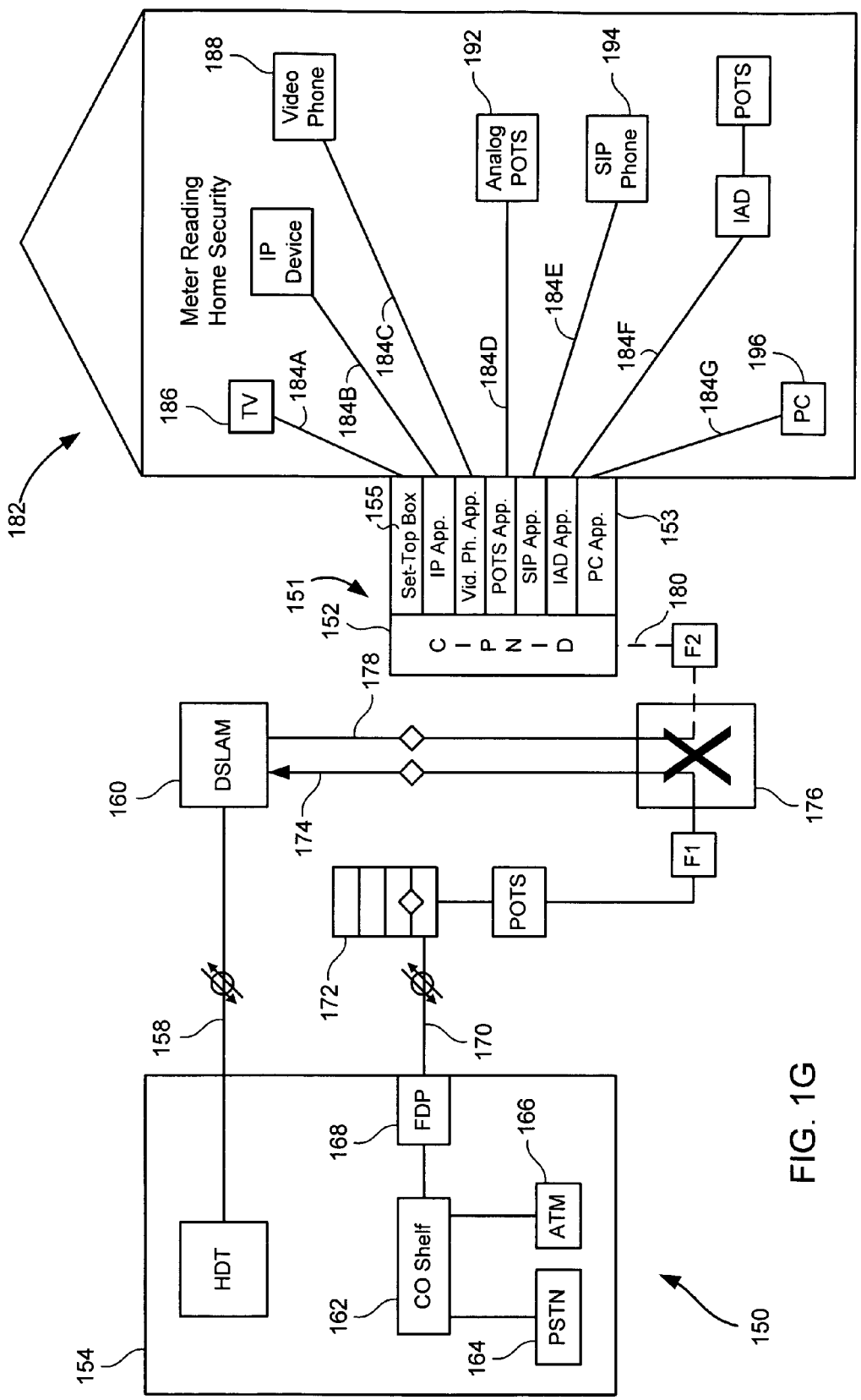

FIG. 1G illustrates another exemplary configuration 150 for using an SNID 151 in an xDSL implementation, according to certain embodiments of the invention. In some embodiments, distribution point 154 can comprise a host digital terminal 156 coupled by transport medium 158 to DSLAM 160. As noted above, however, in other embodiments, DSLAM 160 can be considered the distribution point. Host digital terminal 156 can be coupled to any of a variety of data sources and/or recipients, either directly, or indirectly, such as through the provider's network and/or the Internet. In the illustrated embodiment, transport medium 158 can be a Synchronous Optical NETwork ("SONET") link (e.g., OC-3, OC-12, etc.), although those skilled in the art will recognize that other suitable transport media may be substituted.

In accordance with some embodiments, distribution point 154 also comprises a central office shelf 162 in communication with the PSTN 164, as well with an asynchronous transfer mode ("ATM") network 166, either of which can provide connectivity to any of the variety of data sources and/or recipients discussed above. In certain embodiments, shelf 162 is, in turn, coupled to fiber distribution panel 168, which is connected by transport medium 170 to a digital loop carrier remote termination cabinet 172. Remote termination cabinet 172 can also be coupled to DSLAM 160 by transport medium 174, which may be routed through serving area interface 176. In effect, transport medium 174 can carry one or more POTS information sets, and transport medium 158 can carry one or more non-POTS (in this case xDSL) information sets.

As illustrated, these two information sets can be combined at DSLAM 160, which is in communication with serving area interface 176 through transport medium 178. Serving area interface 176 can be coupled to demarcation device 152 of SNID 151 with transport medium 180. In addition to the demarcation device 152, the SNID 151 comprises an ESTB 155 and a plurality of other application devices 153, the combination being adapted to provide set-top-box and other application functions to various equipment within the customer premises 182. In the illustrated embodiment, the SNID 151 is fixedly attached to an exterior wall at the customer premises 182. The ESTB 155 and other application devices 153 of the SNID 151 may then be coupled via one or more internal transport media 184A-G to a variety of CPE, including without limitation a television set 186, a video phone 188, an analog (POTS) telephone 192, an IP-compatible phone 194, and a personal computer 196. In this way, an SNID 151 can be used to provide a plurality of telecommunication services to a customer premises, including set-top-box functions.

2. Structure of an Set-Top-Box Network Interface Device

Figure 2B:
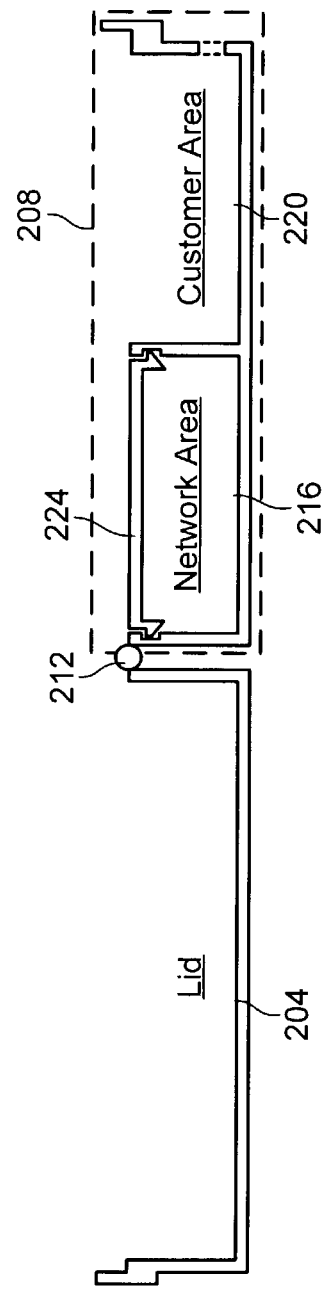

One exemplary embodiment of an SNID 200 is illustrated in FIGS. 2A and 2B. For purposes of illustration, FIG. 2A provides a top view that explicitly shows components within the SNID 200, while FIG. 2B provides a side view that shows the logical organization of the SNID 200 without the components. In the illustrated embodiment, SNID 200 comprises a clamshell design, with a lid portion 204 and a body portion 208 connected by hinges 212A and 212B. The body portion 208 comprises a network area 216 and a customer area 220. Generally, network area 216 is adapted to receive a cover and is designed generally to be accessible only to personnel authorized by the telecommunication service provider. In contrast, when SNID 200 is open, the customer can access customer area 220 to add or remove components as desired. In this and other ways, the SNID 200 serves to isolate the telecommunication service provider's network from the customer's network, as described above.

The SNID 200 can include a first interface 228 for communicating with the provider's external transport medium. Those skilled in the art will recognize that, in some embodiments, as described above, the external transport medium may comprise the twisted-pair copper "local loop" running from the customer's premises to the telecommunication service provider's local office, and interface 228 will allow for the attachment of the local loop to the SNID 200. As discussed above, in other embodiments, the external transport medium can be any of a variety of other media, including satellite transmissions, wireless transmissions, coaxial cable, and the like. In fact, in certain embodiments, the external transport medium can comprise multiple transport media (of the same or different types), for which the SNID 200 could include multiple interfaces. In some such embodiments, the SNID 200 can function to couple a plurality of external transport media to one another, seamlessly increasing the bandwidth available to the customer premises. For instance, a customer premises might have a satellite link to one telecommunication service provider and an ADSL link to another provider, and the SNID 200 could combine or multiplex these two links to provide an apparent single, higher-bandwidth to the customer premises. Similarly, those skilled in the art will recognize that in certain of these embodiments, a particular external transport medium, such as a satellite link, may be more well-suited to one way transmission of telecommunication information; in such cases, the SNID 200 could use a second external transport medium, such as an ADSL link, to allow transmission in the other direction.

Interface 228 can be coupled to a discrimination device 232, which can be operative to separate information sets received on interface 228, and, conversely, aggregate information sets for transmission on interface 22). Merely by way of example, in particular embodiments, discrimination device 232 can separate POTS information from other telecommunication information and/or isolate signals on the internal transport medium from the external transport medium and vice versa. In some embodiments, for instance xDSL implementations, discrimination device 232 can comprise one or more filters. Such filters can include, but are not limited to, high-pass, low-pass, and/or band-pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Discrimination device 232 can be operable to separate information sets through a variety of criteria, including for example, by frequency, by destination device, information type, and/or frequency. Further, in certain embodiments, information sets can be multiplexed (for instance, using various time-division multiplexing or wave-division multiplexing schemes known in the art) for transmission over an external transport medium, and discrimination device 232 can comprise a demultiplexer capable of separating multiplexed signals and, optionally, routing each signal to the necessary destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional, perhaps non-POTS, information sets to be sent and received through interface 236 simultaneously with the POTS information. This can include, for example, aggregating information sets for transmission of an HPNA signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or more microprocessors, including digital signal processor ("DSP") chips, memory devices, including both volatile and nonvolatile memories, and storage devices, including hard disk drives, optical drives and other media. In fact, processing system 244 can comprise the equivalent of one or more personal computers, running any of a variety of operating systems, including variants of Microsoft's Windows™ operating system, as well as various flavors of the UNIXT™ operating system, including open source implementations such as the several Linux™ and FreeBSD™ operating systems.

Telecommunication information or information sets can be processed by processing system 244 in a variety of ways, including, for example, routing a given information set to a particular interface, transforming information such as by encoding and/or decoding information and converting between different transport protocols, storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality-of-service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In certain embodiments, such as those described above with respect to FIG. 1D, an SNID may comprise another interface in communication with a second distribution point 104B through an additional external transport medium 112A, perhaps operated by a different telecommunication service provider. In such a case, the additional external interface could be coupled to discrimination device 232, or it could be coupled to another discrimination device, which could also be in communication with processing system 244, interface 236 and/or aggregator 240. Thus, certain embodiments allow a single SNID to serve as a communication gateway between the customer premises and multiple telecommunication service providers, including combining or multiplexing multiple external transport media (each of which may be in communication with a different telecommunication service provider and/or telecommunication information provider) as discussed above.

In the illustrated example, processing system 244 is in communication with aggregator 240, which, as discussed above, can aggregate non-POTS information sets received from processing system 244 and POTS information sets received directly from discrimination device 232 for consolidated transmission via interface 236. In effect, discrimination device 232 and aggregator 240, perhaps in conjunction with processing system 244, can function to separate telecommunication information received on interface 228 into a set of POTS telecommunication information and a set of non-POTS telecommunication information. POTS information can be understood to include ordinary telephone signals, and non-POTS information can be understood to include all other telecommunication information). The non-POTS information is routed via transport medium 248 to processing system 244 for processing, and the POTS information is routed to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse, i.e., to separate and recombine different sets of telecommunication information received on interface 236 from the customer's premises. Thus, in some embodiments, both discrimination device 232 and aggregator 240 each can perform a combined discrimination-device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244, and could route information sets among any of those three components as necessary. Moreover, as described below, the functionality of discrimination device 232 and/or aggregator 240 can be incorporated into processing system 244; likewise discrimination device 232 can incorporate interface 228 and/or aggregator 240 can incorporate interface 236, such that discrimination device 232 and/or aggregator 240 comprise the necessary components to be coupled directly to the external and internal transport media, respectively.

Discrimination device 232 and/or aggregator 240 can also serve another function in certain embodiments: Since the external transport medium is coupled to first interface 228 and the internal transport medium can be coupled to, inter alia, second interface 236, the discrimination device 232 and/or aggregator 240 can serve as an isolation device for intermediating between the two media, such that when a topological change occurs in one of the media, only the SNID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system 244. In yet other embodiments, the isolation device might comprise a separate piece of hardware in communication with discrimination device 232, aggregator 240 and/or processing system 244.

In order to effect the set-top-box functionality, the SNID 200 comprises an ESTB 246A, and may also comprise one or more other application devices 246B and 246C to implement supplementary applications. The ESTB 246A and other application devices are usually disposed in the network area 216, but as illustrated for other application device 246B, they may sometimes be disposed in the customer area 208 to permit access by the customer. The ESTB 246A is provided in communication with the processing system 244 by transport medium 268. The other application devices 246B and 246C may also be provided in communication with the processing system 244 by transport media 251 and 263. The ESTB 246A is also in communication with interface 260 over transport medium 269, which allows communication with the transport media internal to the customer premises. For example, interface 260 could be a coaxial interface for connection to RG6 and/or RG59 cable. Similar communication with the transport media internal to the customer premises may also be provided in some embodiments for application devices providing supplementary services. Such an example is illustrated with other application device 246B in communication with interface 256 over transport medium 264. Merely by way of example, interface 256 could be an RJ45 and/or RJ11 interface for connection to unshielded twisted pair cable, which can, for instance, form a 10Base-T Ethernet network.

To illustrate, if interface 228 receives telecommunication information that includes digitally encoded video signals, such as MPEG-2 data, the information set that includes the encoded video signals can be routed by discrimination device 232 to processing system 244. After transmission from the processing system to the ESTB 246A over transport medium 268, the signals can be decoded into RF-modulated NTSC, HDTV, PAL and/or SECAM format for transmission via transport medium 269 to coaxial interface 260, where it can be transmitted via coaxial cable to one or more televisions at the customer premises.

For other supplementary applications, such as illustrated with other application device 246C, information might be routed from the application device 246C through the aggregator 240. Such an arrangement may be suitable for supplementary applications that use IP data, such as a VoIP application. For example, the SNID 200 might receive IP data combined with television information and perhaps also other types of telecommunication information, on interface 228. The information sets can be routed by the discrimination device 232 via medium 248 to processing system 244, where they can be processed. Television information could then be routed via transport medium 268 to the ESTB 246A for subsequent delivery of that information through interface 260 in accordance with the level of service subscribed for by the customer. For example, premium television channels may or may not be decoded by the ESTB 246A and pay-per-view programming may or may not be transmitted by the ESTB 246A depending on the service level.

Similar types of routing and processing may be performed for supplementary applications as well. It will be appreciated that it many instances the supplementary applications act to enhance the functionality provided by the ESTB 246A. In other instances, the supplementary applications provide functionality in the customer premises that is not directly related to the ESTB 246A functions, but which is conveniently coordinated by the SNID 200. For instance, if other application device 246C comprises a VoIP application device, the corresponding IP data information set received at the processing system 244 could be extracted and routed to other application device 246C over transport medium 251. It may then be provided to the customer's existing telephone wiring using interface 236, optionally in conjunction with aggregator 240 and/or one or more line drivers. In this way, the SNID can allow virtually unlimited connectivity options for each CPE at the customer premises, in addition to providing the set-top-box functionality. Adding to the flexibility of SNID 200, the processing system 244 could include components to serve, for example, as a cable or xDSL modem, as well as components to serve as an Ethernet hub, switch, router, or gateway, the functions of each of which are familiar to those of skill in the art.

There are a variety of different other application devices 246B and 246C that may be incorporated within the SNID 200 in order to provide a versatile range of supplementary functionality. The following examples are provided merely by way of illustration and still other application devices that may additionally or alternatively be used will be evident to those of skill in the art after reading this description. One supplementary application device 246B or 246C that may be included is a digital-recorder application device, which could provide a mechanism for digital recording of all forms of information incoming to the SNID 200 and make them accessible to a user at the customer premises. The information that could be recorded includes video, data, voice, among other types of information. Another supplementary application device 246B or 246C that may be included is a digital storage application device, which could provide a supplementary mechanism for storing information presented to user applications. The information that could be stored also includes video, data, voice, and other types of information. The combination of a digital-recorder application device and a digital-storage application device in an SNID 200 may be used conveniently to provide primary and secondary information-storage capabilities. For example, a digital-recorder application could be used to provide a primary, on-line, video storage capability while a digital-storage application could be used to provide a secondary, off-line, video storage capability. Still other supplementary application devices could be included to enhance such functionality further, such as a hard-drive application device to permit expandable storage capabilities.

Other examples of supplementary application devices 246B or 246C whose functions may be conveniently coordinated include digital-asset application devices. For example, one of the other application devices 246B or 246C in the SNID 200 could comprise a digital-asset sharing application device to permit sharing of information among equipment within the customer premises. Such an asset-sharing capability may be used within the customer premises to share video, data, electronic books, games, music, and the like. Another of the other application devices 246B or 246C could comprise a digital-asset caching application device to permit storage and distribution of digital assets. The combination of digital-asset sharing application devices and digital-asset caching application devices among a plurality of SNIDs 200 in a service area could then be used to permit exchange of video, data, electronic books, games, music, and the like among customer premises throughout a defined service area. In some instances, a further supplementary application device 246B or 246C could comprise a digital-asset protection application device to control the distribution of digital assets in accordance with legal restrictions, such as those derived from copyright ownership.

In some embodiments, the other application devices 246B or 246C may comprise application devices for effecting various voice-related applications within a customer premises. For example, a voice application device could include functionality to provide such functions as telephone caller identification, call logs, voice mail-storage, voice-mail retrieval, call waiting, solicitation barriers, and the like. In addition, a VoIP application device could provide support for VoIP functions within the customer premises.

Still further supplementary application devices 246B or 246C that may be used include various types of informational applications. For example, an online digital guide application device could be used to provide a digital data guide for television, music, and other types of programming. Such a data guide could be provided alternatively in real time or in non-real-time. A further example of an informational application could be realized with a home-utilities application device adapted to provide monitoring and/or billing tracking functions for utilities used within the customer premises. In this way, the use and/or cost of electricity, gas, water, and other utilities may be monitored by the customer. In addition, a diagnostic-interface application device may be provided to permit diagnostic functions of equipment within the customer premises, thereby permitting the customer to obtain information on the functioning of such equipment.

Other application devices 246 may provide security functions. For example, a data security application device may be used to provide hacker protection for the home, responding to identified attempts to breach the security of the customer premises. In addition, a home-security application device could be provided to monitor the physical security of the customer premises. Such a home-security application device would typically be provided with an interface to door and window monitors to determine whether they are open or shut, and with an interface to motion detectors, glass-breaking detectors, and other physical security equipment known to those of skill in the art.

The ESTB 246A and each of the supplementary application devices 246B or 246C in the SNID may include a service interface 277 to permit their states to be changed and/or updated. As previously noted, such interfaces may comprise physical interfaces such as USB, FireWire (IEEE 1394), RJ-11, RJ-45, serial, coaxial, or other physical interfaces, to permit a service technician to interact with the ESTB 246A or supplementary application devices 246B or 246C while at the site of the SNID 200. Alternatively, the service interfaces may comprise logical interfaces to permit IP addressing to be used in changing the state of the application devices. In many instances, the SNID 200 may also include a future-application device with open architecture to support new applications. The architecture may be configured by use of the service interfaces 277 when the new application is implemented.

In certain embodiments, SNID 200 can comprise a line driver (not shown on FIG. 2A or 2B), coupled to processing system 244 and aggregator 240. The line driver can function to allow conversion between various network formats and media, allowing a variety of different media types, e.g., twisted pair and/or coaxial cable, in accordance with the HPNA and HPNA+ standards, as well, perhaps, as the customer premises' A/C wiring, in accordance, for example, with the HomePlug™ standard, to transport combined POTS and non-POTS information sets.

In certain embodiments, SNID 200 can comprise a power supply 272 for providing electrical power to the components in SNID 200. Power supply 272 can be powered through electrical current carried on the external transport medium and received on interface 228. Alternatively, power supply can receive electrical current from a coaxial interface, such as interface 256, or through a dedicated transformer plugged into an AC outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

As mentioned above, processing system 244 can comprise a plurality of processing devices, and each processing device can comprise multiple components, including microservers, memory devices, storage devices and the like. As used herein, a "microserver" is intended to refer to any device programmed to perform a specified limited set of functions, such as an EPROM. Merely by way of example, FIG. 2C provides a detailed illustration of an exemplary processing system 244, which comprises multiple processing devices 291. In accordance with the exemplified embodiment, transport medium 248 links processing system 244 with an external transport medium, perhaps via a discrimination device and/or interface, as described above.

Transport medium 248 can be coupled to a plurality of microservers 291 such that any information received by the processing system 244 via transport medium 248 may be routed to any of the microservers 291. Each microserver can, in some embodiments, be the equivalent of a server computer, complete with memory devices, storage devices, and the like, each of which is known in the art. In FIG. 2C, storage devices 293 associated with each of the microservers 291 are shown. One of the microservers 291A may be associated with the ESTB 246A and each of the other microservers 291B and 291C may be associated with a respective one of the supplementary application devices 246B or 246C. The supplementary microservers 291B and 291C may individually be adapted to function as, for example, HTML microservers, authentication microservers, FTP microservers, TFTP microservers, DHCP microservers, WebServer microservers, email microservers, critical alert microservers, home-security microservers, VPN microservers, advertising microservers, instant-messaging microservers, wireless microservers, rf microservers, test-access microservers, data-security microservers, and the like.

In addition to these functions, microservers 291 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microservers 291 can serve switching functions somewhat similar to that described with respect to discrimination device 232 described in relation to FIG. 2A. For instance, if television-signal data is received by microserver 291A, such data can be routed to the ESTB 246A for decoding and transmission as appropriate according to subscription service levels. As an example of a supplementary application, if IP data is received by microserver 291B, such data can be routed to an Ethernet connection, to the existing telephone wiring, e.g., in an HPNA implementation, or to any other appropriate medium, perhaps via an appropriate line driver. In fact, in certain embodiments, processing system 244, and in particular one or more of microservers 291, can incorporate the functionality of discrimination device 232 and/or aggregator 240, rendering those components optional. In some embodiments, one or more of the microservers may be adapted to function as a controller for the SNID 200, overseeing the SNID's state and monitoring performance. In some embodiments, the controller functions can be accessed using a web browser.

Processing system 244 can have multiple means of input and output. Merely by way of example, microservers 296 can communicate with one or more external transport media (perhaps, as discussed above, via intermediary devices) using one or more transport media (e.g., 248). Processing system 244 also can communicate with one or more internal transport media via a variety of information conduits, such as category 5, 5e and/or 6 unshielded twisted pair wire 268, RG6 and/or RG59 coaxial cable 264, and category 3 unshielded twisted pair copper (telephone) wire 252, again possibly via intermediary devices, as discussed with reference to FIG. 2A. Notably, some embodiments of processing system 244 can include interfaces for multiple transport media of a particular type, for instance, if processing system 244 serves as a networking hub, switch or router. Processing system 244 can also have infra-red and radio-frequency receivers and transmitters, for instance to allow use of a remote control device, as well as wireless transceivers, for instance to allow wireless (e.g., IEEE 802.11) networking.

Figure 2D:
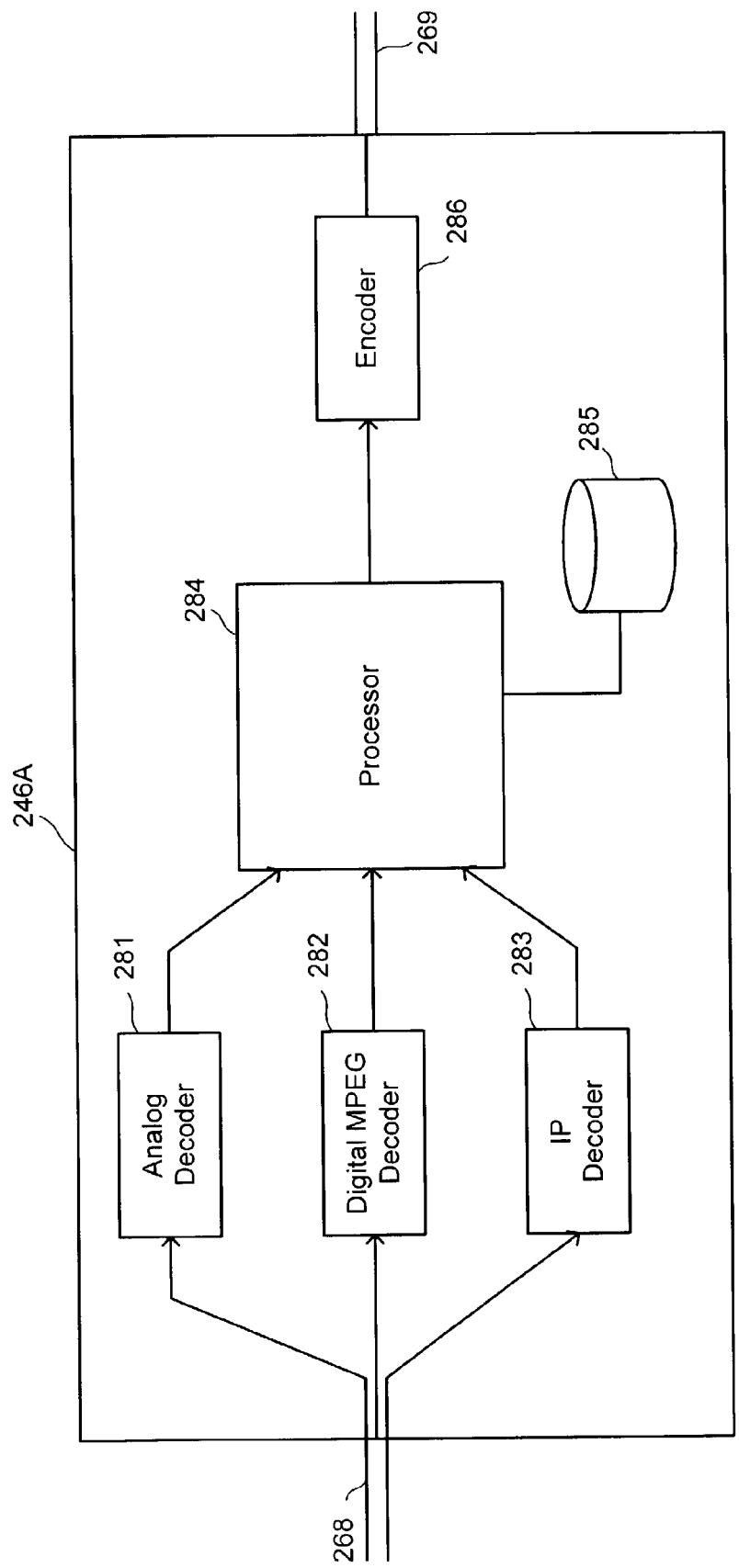

FIG. 2D provides an exemplary architecture for the ESTB 246A that may be used in embodiments of the invention. The components in this exemplary architecture are provided for purposes of illustration and it will be appreciated that additional or fewer components may be provided in alternative embodiments. Signals incoming to the ESTB 246A over transport medium 268 may be directed to one of a plurality of decoders, shown to include an analog decoder 281 suitable for decoding analog television signals, a digital MPEG decoder 282 suitable for decoding digital television signals, and an IP decoder 283 suitable for decoding IP signals. The analog decoder 281 may receive composite analog video signals that it separates as red, green, blue, and sync ("RGBS") signals, using the NTSC, PAL, or SECAM standards as may be appropriate. The digital decoder 282 may receive digital audio and video signals, which are decompressed according to the MPEG-2 or a related standard, such as MPEG-1 or MPEG-4. The IP decoder 283 may be used in applications discussed below that are integrate IP functions within the ESTB 246A. The processor 284 controls operation of the decoders 281, 282, and 283 to receive signals decoded from the incoming signals and to transmit suitable signals to an encoder 286 according to appropriate service-level conditions. The encoder 286 converts the individual components of signals into composite signals for display on a television, transmitting the composite signals over transport medium 269. For example, the encoder 286 could combine luminance Y and chrominance C signals to produce a video image, or could perform encoding according the NTSC, PAL, or SECAM standards. The encoder may also act to synchronize video and audio streams in producing the television signals. As noted in FIG. 2D, the ESTB 246A may itself include a buffer 285 in communication with the processor for implementing personal-video-recording ("PVR") functionality within the ESTB 246A.

Notably, different embodiments of the SNID can provide several benefits, including simultaneous video, data and voice transmission, while maintaining required Quality of Service levels for each particular information set. Further, some embodiments of the SNID can comprise a router that is capable of multi-protocol label switching ("MPLS"), which, those skilled in the art will recognize, allows the telecommunication service provider tremendous flexibility in designing the architecture of the external transport medium, including options, such as "Ethernet in the last mile" and tag switching, that provide enhanced features and performance across the provider's network. Various embodiments of the SNID also allow for a plurality of virtual private networks to be established through the SNID, allowing one or more secure data connections from the customer premises to other locations.

There are, furthermore, a number of different features that may be supported by the ESTB using the organizational descriptions described above. Merely by way of example, the ESTB may be used to provide middleware support, programming guides, pay-per-view functionality, video-on-demand functionality, encryption and decryption support for video signals and authentication functions, billing interfaces, closed-captioning functionality, macrovision functionality, and the like. In addition the ESTB may provide various forms of management support, including fault monitoring, internal ESTB monitoring, remote reboot support, remote shutdown, and the like.

3. Implementation

Figure 3:
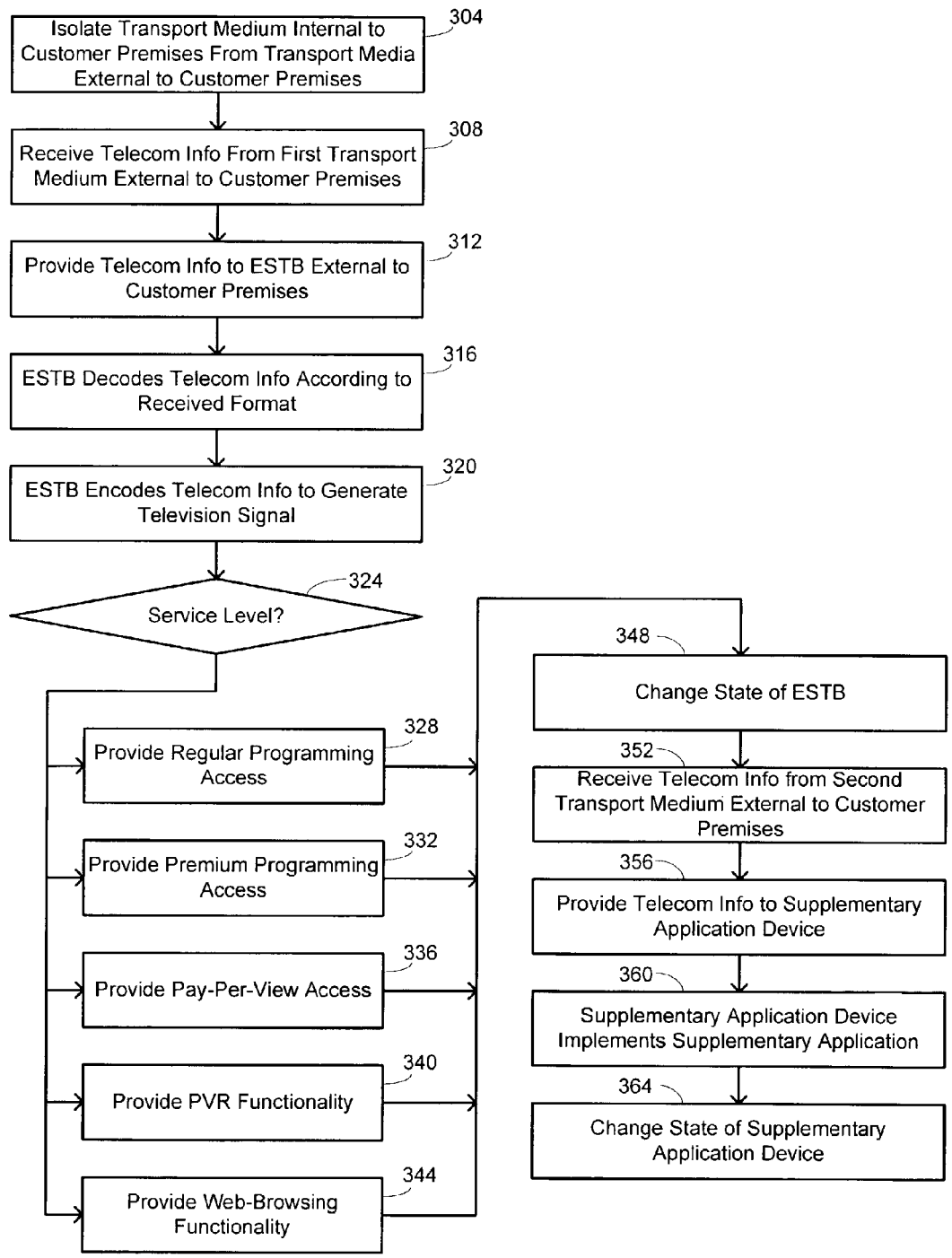
FIG. 3 is a flow diagram illustrating methods of providing television signals according to embodiments of the invention.

Methods for providing television signals in accordance with embodiments of the invention may be implemented using one or more of the SNID structures described above. FIG. 3 provides a summary of several such embodiments. Since specific details of how each of the steps shown in FIG. 3 may be implemented have been provided in detail above, these steps are described relatively briefly in connection with FIG. 3. At block 304, a transport medium internal to a customer premises is isolated from transport media external to the customer premises. Such isolation permits a flow of telecommunication information between the internal and external transport media to be mediated by the SNID. Thus, at block 308, telecommunication information is received from a first transport medium external to the customer premises, such as by the SNID. At block 312, this telecommunication information is provided to the ESTB, which is located external to the customer premises so that the ESTB may decode it according to the format in which it is received at block 316. A television signal is generated by subsequently encoding the information at block 320 according to NTSC, PAL, SECAM, or similar formats.

Subsequent actions taken by the ESTB may depend on a level of service that the ESTB is configured to provide to a particular customer premises, as checked at block 324. For example, if the service level includes providing access to regular television programming and the received telecommunication information includes such regular programming, the corresponding television signal is provided to the internal transport medium at block 328. Similarly, if the service level includes providing access to certain premium television programming and the received telecommunication information includes that premium programming, the corresponding television signal is provided to the internal transport medium at block 332. In other embodiments, the service level may include providing access to a certain pay-per-view program; usually such a service level is of short duration and in response to a specific request transmitted to the ESTB in accordance with the nature of pay-per-view programming. In such instances, and where the received telecommunication information includes the requested program, the corresponding television signal is provided to the internal transport medium at block 336.

The ESTB may also provide PVR functionality in some embodiments, as indicated at block 340. Such functionality may make use of a buffer data-storage facility included within the ESTB and is implemented by responding to interactivity between the ESTB and the internal transport medium. Provided that the service level permits such functionality, instructions from a user transmitted over the internal transport medium to the ESTB may cause the ESTB to change the manner in which television signals are transmitted. For example, the ESTB may write information to the buffer data-storage facility, may transmit information from the buffer at normal speed, increased speed, or in reverse order, and may pause transmission. In this way, the user is provided with the ability to control transmission of the television signals by pausing, fast-forwarding, rewinding, and the like. Furthermore, this functionality may be provided in concert with a remote-controlled signalling in which the ESTB is equipped with the capacity to be controlled with a remote transmitter. In some instances, multiple remote transmitters within the customer premises may be equipped to control the ESTB, with addressibility of the remote transmitters being used by the ESTB to distinguish them. In particular, infrared-over-coax signalling could be used with an addressable controller that receives infrared signals from the transmitters, converts the signals, and transmits them back to the SNID.

Such interactivity may also be used in providing web-browsing functionality, as indicated at block 344. Such functionality may be provided in those embodiments where the ESTB includes an IP decoder with which the web-browsing capability may be implemented. The ESTB acts as an interface between the internal transport medium, onto which a user puts instructions for accessing particular web sites, transmitting information to those web sites, downloading information from those web sites, and the like, and the external transport media, from which corresponding information is retrieved or onto which corresponding information is transmitted. In this way, users who want web access but who do not wish to pay for the cost of a personal computer because they do not want or need its other capabilities, are provided with an economical way to use web-browsing functionality. This functionality permits, for example, such users to engage in electronic commerce and other applications.

In a manner similar to the interactive functionality, the ESTB may be configured to provide data-caching functionality in some embodiments. For example, the ESTB could be configured automatically to receive certain subscription data, such as news, shopping catalogs, brochures, premium programming, web pages, magazines, and the like, and to write such data to a data-storage facility comprised by the SNID. The user could then access such information at her convenience. In the case of subscriptions, such as to news or to magazines, the ESTB could be configured automatically to overwrite old information with new information as it is received so that the user always has access to the most recent "issue" of her subscription.

While the left column of FIG. 3 indicates these various functions of the ESTB and/or SNID, the right column indicates that this functionality may be enhanced and/or integrated with supplementary functionality in various embodiments. Thus, at block 348, it is possible to change a state of the ESTB. Such a change in state may be used, for example, to change service levels so that more or fewer of the functions described in connection with the left column become accessible to a specific customer premises. Such changes in state may be made for indefinite periods of time or may be more transient, such as in the case of providing a pay-per-view program, in which case the change in state may be effected only for approximately the length of the program.

Blocks 352-364 indicate the supplementary functionality may also be provided using a second external transport medium. In many instances, such supplementary functionality is provided with an integrated SNID that comprises one or more supplementary application devices in addition to the ESTB and as described above. Thus, at block 352, telecommunication information is received from the second external transport medium and provided to the supplementary application device at block 356. The supplementary application device implements the supplementary application, for which several examples have been described above, at block 360. The state of the second application device may be changed, as indicated at block 364, to effect a change in its functionality.

Those of skill in the art will appreciate that while the blocks in FIG. 3 are provided in an exemplary order, there is no requirement that respective steps be performed in the order shown. In some embodiments, the respective steps may be performed in a different order. Also, there is no requirement that all of the steps shown in FIG. 3 be performed in a given embodiment since the telecommunication information may be provided to the internal transport medium in accordance with embodiments of the invention by performing a subset of the recited steps.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:
1. A network interface device comprising:
an isolation device adapted to isolate a transport medium internal to a customer premises from a first transport medium external to the customer premises such that operational changes to one of the internal and external transport media do not affect the other of the internal and external transport media, wherein the isolation device includes a customer area accessible to a customer of a telecommunication service provider and a network area inaccessible to the customer of the telecommunication service provider;
a first interface coupled with the isolation device and adapted to communicate with the first external transport medium, wherein the first external transport medium is in communication with a distribution point;
a second interface coupled with the isolation device and adapted to communicate with the internal transport medium;
an addressable external set-top box (ESTB) disposed within the network area of the isolation device and external to the customer premises and coupled with the first and second interfaces, wherein the external set-top box:
receives encoded telecommunication information from the first external transport medium;

receives instructions from a remote control device via the internal transport medium, the remote control device being disposed within the customer premises;

generates television signals from the encoded telecommunication information for transmission over the internal transport medium as a function of the instructions received from the remote control device; and transmits the generated television signals over the internal transport medium to at least one customer premises device disposed within the customer premises; and a digital video recorder application device, disposed within the network area of the isolation device to provide video storage capability.

2. The network interface device recited in claim 1 wherein the network interface device is disposed on an exterior wall of the customer premises.

3. The network interface device recited in claim 1 further comprising an addressable application device coupled with the first and second interfaces and adapted to implement a supplementary application over the internal transport medium with telecommunication information received from the external transport medium.

4. The network interface device recited in claim 3 wherein the addressable external set-top box and addressable application device are disposed within a common housing.

5. The network interface device recited in claim 1 further comprising:
a third interface coupled with the isolation device and adapted to communicate with a second transport medium external to the customer premises; and
an addressable application device coupled with the third and second interfaces and adapted to implement a supplementary application over the internal transport medium with telecommunication information received from the second external transport medium.

6. The network interface device recited in claim 5 wherein the addressable external set-top box and addressable application device are disposed within a common housing.

7. The network interface device recited in claim 1 wherein:
the encoded telecommunication information comprises encoded digital telecommunication information; and
the addressable external set-top box comprises a digital decoder adapted to decode the encoded digital telecommunication information.

8. The network interface device recited in claim 1 wherein:
the encoded telecommunication information comprises encoded IP telecommunication information; and
the addressable external set-top box comprises an IP decoder adapted to decode the encoded IP telecommunication information.

9. The network interface device recited in claim 1 wherein the addressable external set-top box comprises a buffer data store.

10. The network interface device recited in claim 1 wherein:
the internal transport medium comprises a plurality of transport media internal to a plurality of respective customer premises;
the second interface comprises a plurality of second interfaces coupled with the isolation device, each of the plurality of second interfaces being adapted to communicate with a respective one of the internal transport media; and
the addressable external set-top box comprises a plurality of addressable external set-top boxes, each of which is coupled with the first interface and with a respective one of the second interfaces, wherein each such addressable external set-top box is adapted to receive encoded telecommunication information from the external transport medium and to generate television signals from the encoded telecommunication information for transmission over the respective one of the internal transport media.

11. The network interface device recited in claim 10 wherein the plurality of respective customer premises are located within a common physical structure.

12. The network interface device recited in claim 11 wherein the network interface device is disposed on an exterior wall of the common physical structure.

13. The network interface device recited in claim 11 wherein the network interface device is disposed within the common physical structure but external to each of the respective customer premises.

14. The network interface device recited in claim 1 wherein the first transport medium and the second transport medium are different transport mediums chosen from a list consisting of: a satellite link, wireless transmissions, coaxial cable, and ADSL.

15. A method for providing television signals, the method comprising:
isolating a transport medium internal to a customer premises from a transport medium external to the customer premises with an isolation device such that operational changes to one of the internal and external transport media do not affect the other of the internal and external transport media, wherein the isolation device includes a customer area accessible to a customer of a telecommunication service provider and a network area inaccessible to the customer of the telecommunication service provider;

receiving encoded telecommunication information from the external transport medium, receiving instructions from a remote control device via the internal transport medium, the remote control device being disposed within the customer premises; and decoding, as a function of the instructions received from the remote control device, the encoded telecommunication information with an addressable external set-top box (ESTB) disposed within the network area of the isolation device and external to the customer premises;

generating television signals from the decoded telecommunication information; and transmitting the television signals to the internal transport medium for display on a television within the customer premises; and providing, with a digital video recorder application, disposed within the network area of the isolation device video storage capability.

16. The method recited in claim 15 further comprising:
receiving an instruction to change a state of the addressable external set-top box; and
changing the state of the addressable external set-top box in accordance with the received instruction.

17. The method recited in claim 15 further comprising implementing a supplementary application over the internal transport medium with telecommunication information received from the external transport medium.

18. The method recited in claim 15 further comprising:
receiving telecommunication information from a second transport medium external to the customer premises; and implementing a supplementary application over the internal transport medium with the telecommunication information received from the second external transport medium.

19. The method recited in claim 15 wherein:
the encoded telecommunication information comprises encoded digital telecommunication information; and
decoding the encoded telecommunication information comprises decoding the encoded digital telecommunication information.

20. The method recited in claim 15 wherein:
the encoded telecommunication information comprises encoded IP telecommunication information; and
decoding the encoded telecommunication information comprises decoding the encoded IP telecommunication information.

21. The method recited in claim 15 further comprising storing the television signals with a buffer data store comprised by the external set-top box.

22. The method recited in claim 21 wherein transmitting the television signals comprises transmitting the stored television signals in response to instructions received from the internal transport medium.

23. The method recited in claim 21 wherein transmitting the television signals comprises transmitting the stored television signals in response to instructions received from a remote-controlled transmitter.

24. The method recited in claim 23 wherein the instructions comprise an identification of one of a plurality of remote-controlled transmitters.

25. The method recited in claim 15 wherein:
decoding the encoded telecommunication information with the addressable external set-top box comprises decoding the encoded telecommunication information with a plurality of addressable external set-top boxes; and
transmitting the television signals to the internal transport medium comprises transmitting television signals generated from respective ones of the plurality of addressable external set-top boxes to respective ones of a plurality of internal transport media for display on respective televisions within respective ones of a plurality of customer premises.

26. The method recited in claim 25 wherein the plurality of customer premises are located within a common physical structure.

27. A network interface device comprising:
means for isolating a transport medium internal to a customer premises from a transport medium external to the customer premises such that operational changes to one of the internal and external transport media do not affect the other of the internal and external transport media, wherein the means for isolating include a customer area accessible to a customer of a telecommunication service provider and a network area inaccessible to the customer of the telecommunication service provider;
means for receiving encoded telecommunication information from the external transport medium;
means for decoding the encoded telecommunication information, wherein such means for decoding is disposed within the network area of the means for isolating and external to the customer premises;
means for receiving instructions from a remote control device via the internal transport medium, the remote control device being disposed internal to the customer premises;
means for generating television signals from the decoded telecommunication information as a function of the instructions received from the remote control device;
means for transmitting the television signals to the internal transport medium for display on a television within the customer premises; and
means for providing, with a digital video recorder application, disposed within the network area of the isolation device video storage capability.

28. The network interface device recited in claim 27 further comprising:
means for receiving telecommunication information from a second transport medium external to the customer premises; and
means for implementing a supplementary application over the internal transport medium with the telecommunication information received from the second external transport medium.

29. The network interface device recited in claim 27 further comprising means for storing the television signals.

* * * * *